(12) United States Patent
Xie et al.

(10) Patent No.: US 11,394,032 B2
(45) Date of Patent: Jul. 19, 2022

(54) IONOMER/CATALYST INTERFACE

(71) Applicant: Indiana University Research and Technology Corporation, Indianapolis, IN (US)

(72) Inventors: Jian Xie, Carmel, IN (US); Le Xin, Indianapolis, IN (US)

(73) Assignee: INDIANA UNIVERSITY RESEARCH AND TECHNOLOGY CORPORATION, Indianapolis, IN (US)

( * ) Notice: Subject to any disclaimer, the term of this patent is extended or adjusted under 35 U.S.C. 154(b) by 65 days.

(21) Appl. No.: 16/338,688

(22) PCT Filed: Oct. 4, 2017

(86) PCT No.: PCT/US2017/055021
§ 371 (c)(1),
(2) Date: Apr. 1, 2019

(87) PCT Pub. No.: WO2018/067627
PCT Pub. Date: Apr. 12, 2018

(65) Prior Publication Data
US 2020/0127298 A1 Apr. 23, 2020

Related U.S. Application Data

(60) Provisional application No. 62/404,055, filed on Oct. 4, 2016.

(51) Int. Cl.
*H01M 8/103* (2016.01)
*H01M 4/88* (2006.01)
(Continued)

(52) U.S. Cl.
CPC .......... *H01M 4/8892* (2013.01); *B01J 23/42* (2013.01); *B01J 23/44* (2013.01); *B01J 23/464* (2013.01);
(Continued)

(58) Field of Classification Search
CPC .............................. H01M 4/8892; H01M 4/96
See application file for complete search history.

(56) References Cited

U.S. PATENT DOCUMENTS 6,858,349 B1   2/2005  Luo et al.
8,075,951 B2 * 12/2011  Hammond-Cunningham ............
                                                B01D 69/12
                                                427/243
(Continued)

FOREIGN PATENT DOCUMENTS

JP    2007-535787 A    12/2007

OTHER PUBLICATIONS

International Search Report and Written Opinion issued by the ISA/US Commissioner for Patents, dated Dec. 11, 2017, for International Application No. PCT/US2017/055021.
(Continued)

*Primary Examiner* — Osei K Amponsah
(74) *Attorney, Agent, or Firm* — Faegre Drinker Biddle & Reath LLP

(57) ABSTRACT

A catalyst comprising a functionalized substrate having a first charged functional group, a metal dispersed on the substrate, wherein the metal comprises at least one of Pt, Rh, Pd, Ag, Au, Ni, Os, Ir, Mn, Co, alloys thereof, oxides thereof, or mixtures thereof, and an ionomer are disclosed. Methods manufacturing a functionalized catalyst comprising catalyzing a substrate with a metal, functionalizing the catalyzed substrate with a first charged functional group, and add an ionomer to the loaded functionalized catalyst are also
(Continued)

disclosed. Also, methods comprising catalyzing a substrate with a metal, functionalizing the substrate with a first charged functional group, and adding an ionomer to the loaded functionalized catalyst are disclosed.

23 Claims, 23 Drawing Sheets

(51) Int. Cl.
  *H01M 4/96* (2006.01)
  *B01J 23/42* (2006.01)
  *B01J 23/44* (2006.01)
  *B01J 23/46* (2006.01)

(52) U.S. Cl.
  CPC ........ *B01J 23/466* (2013.01); *B01J 23/468* (2013.01); *H01M 4/96* (2013.01); *H01M 8/103* (2013.01)

(56) References Cited

U.S. PATENT DOCUMENTS

| | | | |
|---|---|---|---|
| 2003/0013606 A1* | 1/2003 | Hampden-Smith | B82Y 30/00 502/180 |
| 2005/0221139 A1 | 10/2005 | Hampden-Smith et al. | |
| 2008/0113245 A1 | 5/2008 | Liu | |
| 2010/0028745 A1* | 2/2010 | Salguero | H01M 4/8663 429/483 |

OTHER PUBLICATIONS

Mauritz, Ka et al., "State of Understanding of Nafion." Chemical Reviews, vol. 104, Sep. 21, 2004, pp. 4535-4585.

Shim, J. et al., "Electrochemical characteristics of Pt-WO3/C and Pt-TiO2/C electrocatalysts in a polymer electrolyte fuel cell." Journal of Power Sources, vol. 102, Dec. 2001k, pp. 172-177.

Li et al., "Hierarchical polybenzimi dazole-grafted graphene hybrids as supports for Pt nanoparticle catalysts with excellent PEMFC performance", Nano Energy, vol. 16, 2015, pp. 281-292.

Xin et al., "Novel Catalyst-Layer Structures with Rationally Designed Catalyst/Ionomer Interfaces and Pore Structures Aided By Catalyst Functionalization", ECS Meeting Abstracts, vol. MA2016-02, 2016, p. 2584.

Supplementary European Search Report for EP 17859064 dated Feb. 18, 2020.

Kang Yu et al: "TEM Study of the Ionomer/Catalyst Interface and 3D Pore Structure of Catalyst Layer for PEMFC TEM Study of the Ionomer/Catalyst Interface and 3D Pore Structure of Catalyst Layer for PEMFC", Pacific Rim Meeting on Electrochemical and Solid-State Science 2016, Oct. 2, 2016 (Oct. 2, 2016), page Abstr. 2592, XP05566390831, USA.

Fan Xu et al: "Investigation of the Interaction of Nation Ionomer and Carbon Black Using Small Angle X-ray and Small Angle Neutron Scattering", ECS Transactions, Jan. 1, 2011 (Jan. 1, 2011), pp. 637-645, XP055663831, US.

* cited by examiner

| Sample | Primary particle Diameter (nm) | Aggregate Diameter (nm) | Aggregate size change |
|---|---|---|---|
| NH2-CB | 24.78±0.68 | 76.8±3.5 | 58.3% |
| NH2-CB+NF | N/A | 121.6±2.6 | |
| SO3-CB | 16.73±0.57 | 45.5±2.6 | 1.5% |
| SO3-CB+NF | 13.16±0.24 | 44.8±3.96 | |

FIG. 8

| Sample | Surface Energy [mJ/m$^2$] |
|---|---|
| XC72 | 90.4 |
| COOH-XC72 | 163.9 |
| SO3H-XC72 | 208.6 |
| NH2-XC72 | 98.8 |

FIG. 9

| Sample | Cumulative intrusion (ml/g) | Weight (g) | Total intrusion (mm3) | Physical dimension (mm3) | Porosity |
|---|---|---|---|---|---|
| XC72 30N CL | 1.2082 | 0.0042 | 5.07 | 15 | 33.8% |
| NH2-XC72 30N CL | 0.92604 | 0.0061 | 5.65 | 15 | 37.7% |
| SO3-XC72 30N CL | 0.92746 | 0.0028 | 2.60 | 15 | 17.3% |
| EC300 30N CL | 1.55926 | 0.0042 | 6.55 | 15 | 43.7% |
| NH2-EC300 30N CL | 1.32131 | 0.0055 | 7.27 | 15 | 48.4% |
| SO3-EC300 30N CL | 0.92746 | 0.0030 | 2.78 | 15 | 18.5% |

FIG. 12

| Relative humidity /% | ECSA (m²/g-Pt) | | | Tafel slope (mV/dec) | | | Mass activity @ 0.9 V$_{iR-free}$ (A/g-Pt) | | | V$_{iR-free}$ @ 1.0 A/cm² (V) | | | V$_{iR-free}$ @ 2.0 A/cm² (V) | | |
|---|---|---|---|---|---|---|---|---|---|---|---|---|---|---|---|
| | Pt/XC72 | Pt/SO$_3$H-XC72 | Pt/NH$_2$-XC72 | Pt/XC72 | Pt/SO$_3$H-XC72 | Pt/NH$_2$-XC72 | Pt/XC72 | Pt/SO$_3$H-XC72 | Pt/NH$_2$-XC72 | Pt/XC72 | Pt/SO$_3$H-XC72 | Pt/NH$_2$-XC72 | Pt/XC72 | Pt/SO$_3$H-XC72 | Pt/NH$_2$-XC72 |
| 100 | 27.7 | 19.8 | 30.0 | 69 | 68 | 71 | 187.1 | 183.7 | 291.5 | 0.72 | 0.64 | 0.74 | 0.54 | 0.33 | 0.63 |
| 85 | - | - | - | 89 | 66 | 77 | 188.7 | 182.8 | 270.3 | 0.64 | 0.64 | 0.70 | N/A | 0.33 | 0.57 |
| 55 | - | - | - | 100 | 64 | 79 | 160.1 | 156.8 | 249.2 | N/A | 0.57 | 0.62 | N/A | N/A | 0.31 |
| 30 | - | - | - | 194 | 79 | 85 | 90.7 | 126.0 | 180.0 | N/A | N/A | N/A | N/A | N/A | N/A |

[a] Tested under O$_2$ condition.
Cell: 5 cm², Nafion membrane (212), 50 µm, ca. 0.03 mg-Pt/cm², N/C=0.54, H$_2$ flow (200sccm), O$_2$ flow (400 sccm), 80°C, 150 kPa

FIG. 19

| Catalyst layer (CL) | Average pore diameter (nm) | Porosity (%) |
|---|---|---|
| SO$_3$H-CB (N/C=0.43) | 100.1 | 17.3 |
| NH$_2$-CB (N/C=0.43) | 127.4 | 37.7 |

FIG. 20

IONOMER/CATALYST INTERFACE

CROSS-REFERENCE TO RELATED APPLICATIONS

This application is a U.S. National Stage Application of International Patent Application No. PCT/US2017/055021, filed Oct. 4, 2017, and claims priority to U.S. Provisional Application No. 62/404,055, entitled NOVEL IONOMER/ CATALYST INTERFACE, filed on Oct. 4, 2016, the entire disclosures each of which is hereby expressly incorporated by reference herein in its entirety.

FIELD OF THE DISCLOSURE

This disclosure relates to functionalized catalyst supports including but not limited to carbon blacks, nanographites, graphenes and metal oxides with metallic particles and ionomers bonded thereto. More specifically, this disclosure relates to construct a catalyst/ionomer interface utilizing functionalized catalyst supports (i.e., carboneous materials and metal oxides) with hydrophilic and hydrophobic properties where metallic catalyst particles and ionomers bonded to the functionalized support structure.

BACKGROUND

Catalysts may be understood to be a substance that causes or alters the rate of a chemical reaction and may be recovered, substantially unaltered in form and amount at the end of a reaction. However, in many diverse fields, such as fuel cells and batteries, catalysts may be bonded chemically or physically to a substrate, which may or may not aid the catalyst in performing the desired reaction with sufficient durability.

However, in some instances catalysts may participate in multiple chemical transformations. The participation of the catalyst in multiple chemical transformations may lead to some undesired effects, such as causing the catalyst to separate from the substrate and/or may cause the catalyst to agglomerate. The agglomeration or particle surface migration of catalytic particles on a substrate can decrease the efficacy of the catalysts. This can occur because the efficacy of catalysts is dependent on the surface area of the catalyst available for various chemical transformations and the agglomeration or surface migration of the catalyst can reduce the surface area of the catalyst available for participation in a desired reaction.

The decreased efficiency of catalysts through surface migration or agglomeration, for example in fuel cells, may increase the costs of the fuel cell, reduce the catalytic performance and can also reduce the life expectancy of the fuel cell, which in some situations may be mission limiting.

Also, while limiting surface migration or agglomeration is desired, similarly control of catalyst distribution and size is also desirable. For example, controlling catalyst particle size during production and more evenly distributing the catalysts across a substrate (e.g., having a substantially homogenous distribution), may allow for improved catalytic performance and improved life-cycle prediction, for example, when manufacturing is upscaled.

Furthermore, products and/or by-products of the multiple chemical transformations of various chemical reactions may reduce the available catalytic sites-similar to competitive inhibition-when the products and/or by-products remain on the surface of the catalyst.

For example, in fuel cells, $H_2O$ is often a product of the chemical reaction that takes place in the fuel cell. However, the buildup of $H_2O$ in the fuel cell (e.g., flooding) can decrease the efficiency of the fuel cell, preventing the reactants from reaching the catalyst and, in some instances, may even stop the reaction.

Flooding is also problematic because the presence of excessive amounts of water on various substrates-such as carbon-may cause corrosion. For example, in fuel cells, corrosion of the electrodes may occur if flooding is not prevented or limited when carbon substrates, such as graphene, carbo blacks, graphitic carbon/blacks, graphites or nanographites, are used. The corrosion may also limit the life or durability of fuel cells and may be mission limiting, for example in space exploration and electric vehicles.

Furthermore, substrates with improved kinetic, ohmic, and mass transport performance are needed to help improve performance of the catalyst. However, with surface migration, agglomeration, and corrosion, conventional substrates are substantially limited and, in some cases, limit the ability to use conventional fuel cells, for example, in future space exploration missions and electric vehicles.

Also, ionomers can provide a conduction path for protons in the catalyst layer, but improvements in $O_2$ diffusion in ionomer thin films and improvements in ionomer bonding onto catalysts and substrates is still needed. Additionally, the complete coverage of ionomer over the surface of catalysts and substrates is needed for the catalyst utilization and improved performance.

Accordingly, a need therefore exists to cost effectively address issues of particle surface migration, flooding, corrosion for catalytic surfaces, and $O_2$ diffusion and the binding of ionomer thin films and coverage of ionomer thin film over the surface of catalysts and substrates, such as for electrodes in a fuel cell.

SUMMARY

The present disclosure provides catalysts and methods of manufacturing catalysts containing ionomers. In some embodiments, the catalyst may include a functionalized substrate having a first charged functional group, a metal dispersed on the substrate, wherein the metal comprises at least one of Pt, Rh, Pd, Ag, Au, Ni, Os, Ir, Mn, Co, alloys thereof, oxides thereof, or mixtures thereof, and an ionomer. In some embodiments, the substrate may be a carbon-based substrate or metal oxide based substrate, such as graphene or carbon-based nanotubes or carbon blacks, or graphites. In some embodiments, the carbon-based substrate may be doped, such as sulfur doped-graphene, boron doped-graphene, nitrogen and phosphorus dual-doped graphene, and nitrogen and phosphorus dual-doped carbon nanosheets or carbon blacks, graphites.

The first functional charged group is not particularly limited and, may be positively charged or negatively charged. In some embodiments, various portions of the catalyst may have some charged groups while the ionomer comprises an ionomer charged functional group, wherein the ionomer charged functional group is oppositely charged from the first charged functional group on catalyst. Exemplary first functional groups and ionomer charged functional groups include at least one of sulfonate, $SO_3-$, carboxylate, $COO-$, a tertiary amine, $NR_3^+$, where R is H, alkyl, aryl, or combinations thereof, polybenzimidazole (PBI), poly(ethylene oxide) (PEO), polyphenylene oxide (PPO), polyaniline (PANI), or mixtures thereof.

The catalysts disclosed herein are not particularly limited to a single use. For example, such catalysts may be used in fuel cell membrane electrode assemblies or other products and methods using catalytic reactions. Thus, the scope of the present disclosure includes products incorporating such catalysts, such as membrane electrode assemblies for fuel cells.

The present disclosure also includes various exemplary methods of catalyst manufacture, which may include functionalizing substrate with a first charged functional group, loading a metal (e.g., a metal catalyst) on to the functionalized substrate, wherein the metal comprises at least one of Pt, Rh, Pd, Ag, Au, Ni, Os, Ir, Mn, Co, alloys thereof, oxides thereof, or mixtures thereof, and adding an ionomer to the loaded functionalized catalyst.

Various methods may also include modifying a surface charge, for example, with a diazonium reaction. Similarly, various methods disclosed herein also include modifying the hydrophobicity of the product, for example, with a diazonium reaction.

Some methods may also include functionalizing the substrate with a second ionomer or a plurality of ionomers, wherein the second ionomer comprises a second charged functional group, wherein the second charge functional group is oppositely charged from the first charged functional group. Also, methods may also form an ionomer film on the substrate.

Similarly, various methods may also include methods manufacture comprising catalyzing a substrate with a metal oxide to form a catalyst comprising a metal, wherein the metal comprises at least one of Pt, Rh, Pd, Ag, Au, Ni, Os, Ir, Mn, Co, alloys thereof, oxides thereof, or mixtures thereof, functionalizing the catalyzed substrate with a first charged functional group, and adding an ionomer to the loaded functionalized catalyst.

It will be recognized by persons of ordinary skill in the art that such manufacturing methods may include methods for forming a variety of catalysts and that such catalysts are not limited by their application (e.g., field of endeavor). Thus, while fuel cells are exemplified herein, such methods and catalyst are exemplified, the disclosure is not limited to such endeavors.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein:

FIG. 8 is a table containing aggregate particle size data of various catalysts; and FIG. 9 is a table containing surface energy data of various catalysts;

FIG. 12 is a table containing porosity data of various embodiments;

FIG. 19 contains membrane electrode assembly test data.

FIG. 20 depicts a table of certain properties of two different catalysts

DETAILED DESCRIPTION

The embodiment disclosed below is not intended to be exhaustive or limit the disclosure to the precise form disclosed in the following detailed description. Rather, the embodiments are chosen and described so that others skilled in the art may utilize its teachings.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 1A:
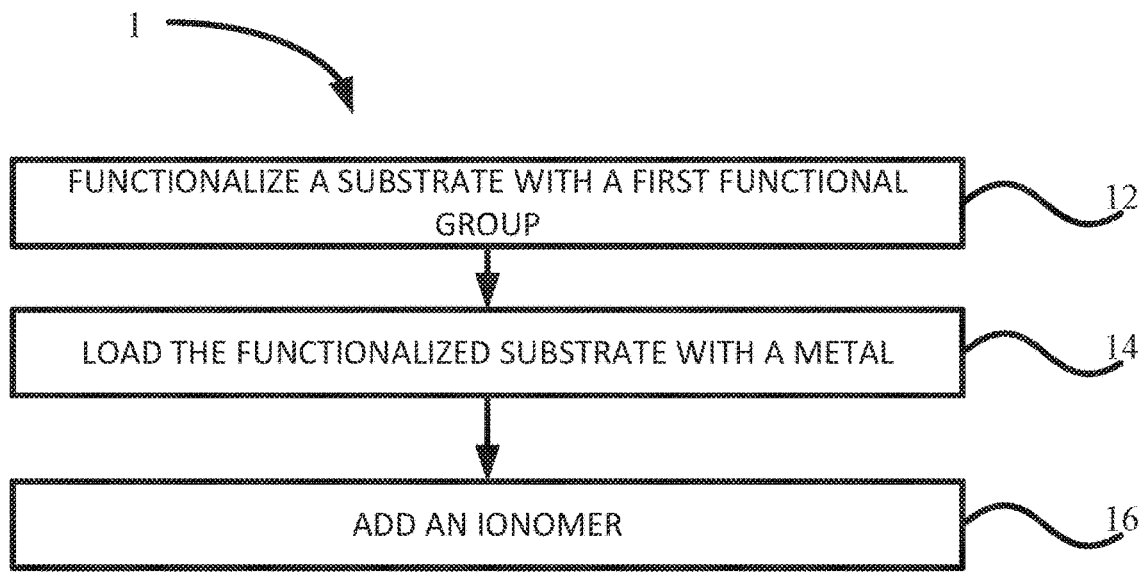
FIGS. 1A and 1B illustrate various methods of manufacturing a catalyst having an ionomer according to various embodiments.
Figure 1B:
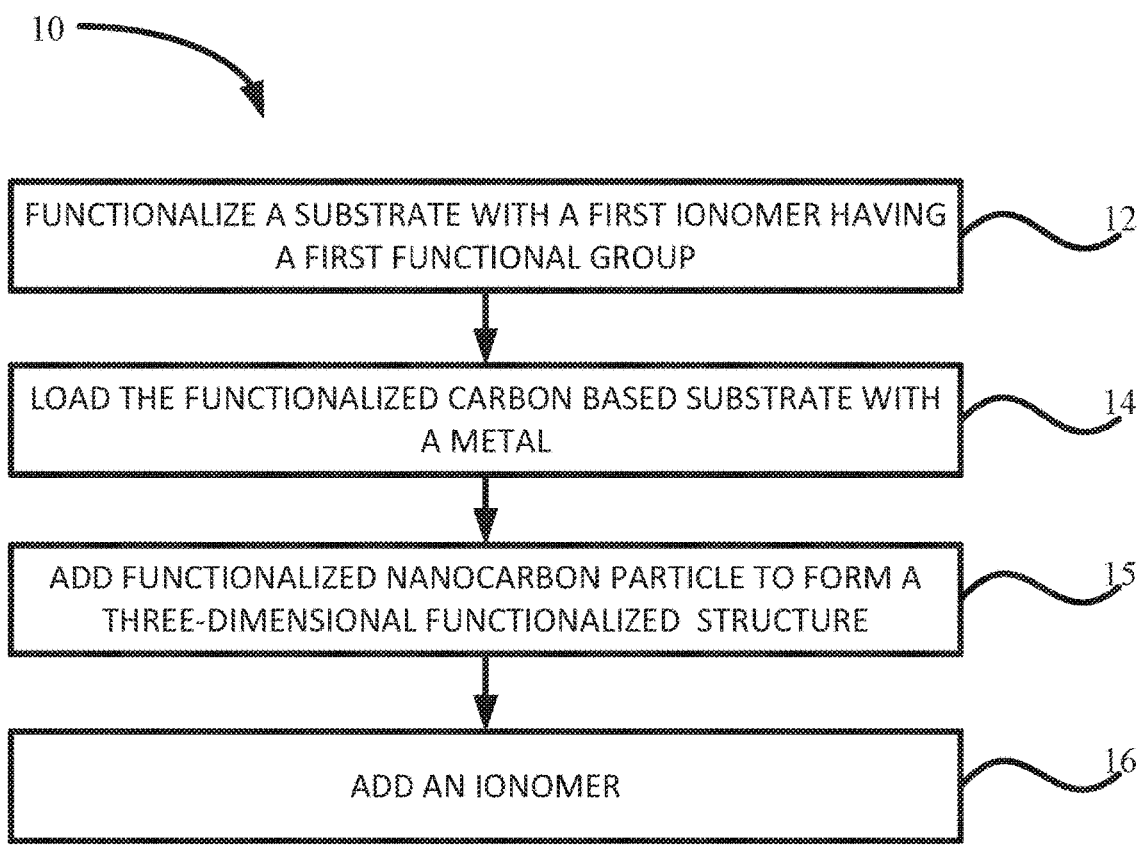

FIGS. 1A and 1B illustrate method 1 and method 10 according to various embodiments. Both method 1 and 10 may include catalysts manufacturing methods including functionalizing substrate with a first functional group (step 12), loading a metal on to the functionalized substrate (step 14), and adding an ionomer, for example, as an ionomer film (step 16).

Method 10 may also include an additional step of adding functionalized nanocarbon particles to form a three-dimensional functionalized carbon-based structure (step 15). The order of methods 1 and 10 are not particularly limited and, thus, a person of skill in the art may recognize with the benefit of this disclosure that some steps may be completed in an alternate order than the ones exemplified, or the steps may be completed simultaneously. For example, in some embodiments, steps 12 and 14 may be done simultaneously.

Figure 2A:
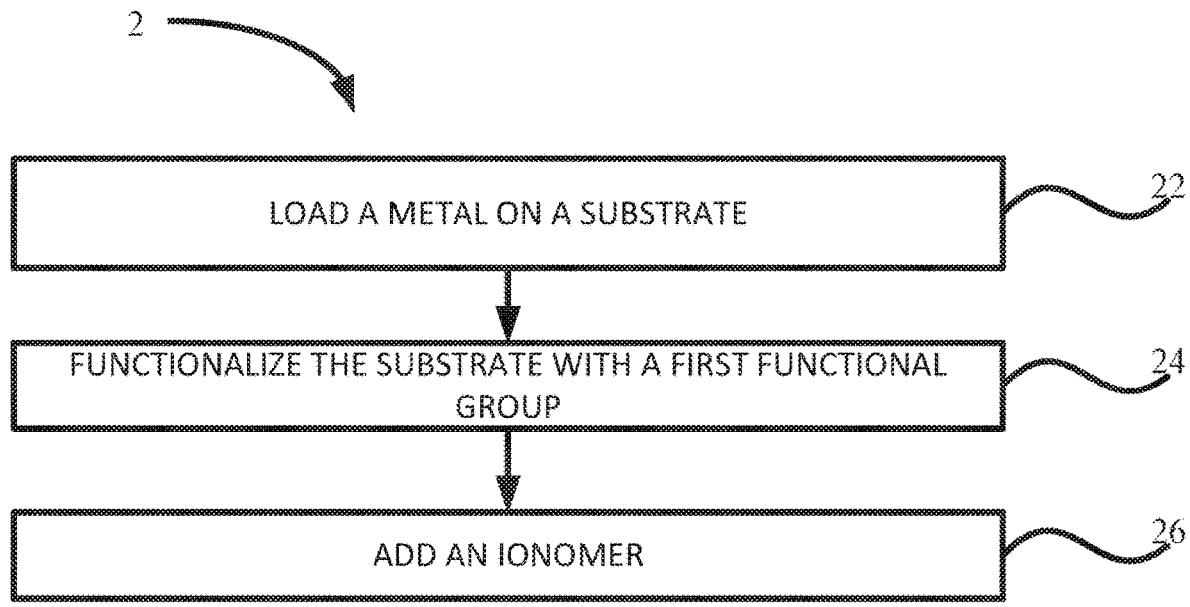
FIGS. 2A and 2B illustrate various methods of manufacturing a catalyst that includes loading a metal on a substrate according to various embodiments.
Figure 2B:
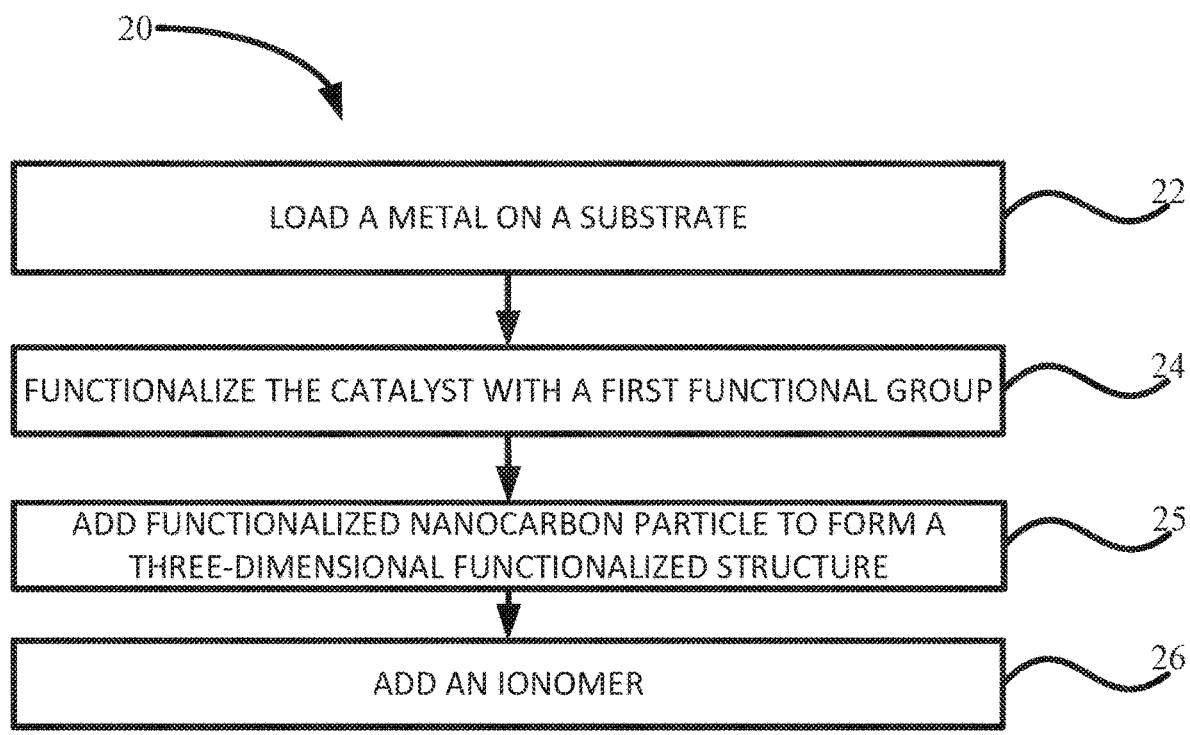

With reference to FIGS. 2A and 2B, methods 2 and 20 are illustrated. Method 2 and method 20 may include loading a metal on a substrate (step 22), functionalizing the loaded substrate with a first functional group (step 24), and adding an ionomer (step 26).

Similar to method 10, method 20 may include adding a functionalized nanocarbon particle to form a three-dimensional carbon-based structure (step 25). For example, in some graphene based catalysts, a three-dimensional structure may be desired and, thus, a spacer may be used. In some embodiments, using other substrates, such as carbon blacks or graphites etc. spacers may not be used to build a three-dimensional structure. Moreover, the order of methods 2 and 20 are not particularly limited and, thus, a person of skill in the art may recognize with the benefit of this disclosure that some steps may be completed in an alternate order than the ones exemplified, or the steps may be completed simultaneously. For example, in some embodiments, steps 22 and 24 may be done simultaneously.

In various embodiments, the three-dimensional functionalized substrates may comprise pores, channels, or a combination thereof. Without being limited to any theory, it is believed that the pores, channels, and mixtures thereof may allow for increased catalytic surface area, while providing sufficient volumetric flow for reactants supplied for catalytic reactions or products and by-products produced by the catalytic reactions. For example, in fuel cells, it is believed that the three-dimensional structures produced by methods 10 and/or 20 may allow for improved mass transport of reactants (i.e. $H_2$, methanol, ethanol, $O_2$, etc.), products and water drainage, which may increase the overall fuel cell performance including improving catalytic performance, increasing fuel utilization, and reducing or preventing flooding of the electrode.

Thus, as can be seen from catalyst manufacturing methods 1, 10, 2, and 20, the substrate may be functionalized with one or more functional groups, for example, to control metal particle dispersion. Accordingly, with the benefit of this disclosure, a person of ordinary skill in the art would be able to adapt, modify, or alter the order of various steps of the methods disclosed herein to practice methods not explicitly exemplified herein, but within the scope of this disclosure.

The metal is not particularly limited and may be any catalytic metal. Thus, various methods may include at least one of Pt, Rh, Pd, Ag, Au, Ni, Os, Ir, Mn, Co, alloys thereof, oxides thereof, or mixtures thereof. For example, the metal may comprise Pt and Ni, such as a Pt—Ni alloy.

In various embodiments and aided by the benefit of this disclosure, one of ordinary skill in the art will appreciate that various methods disclosed herein may also include simultaneous surface functionalization and/or de-alloying of the metal (e.g., PtNi nanoparticles). Also, with the benefit of this disclosure, a person of ordinary skill will recognize the effects of acids used for post-functionalizing and de-alloying of the metals (e.g., PtNi nanoparticles). Various acids may be categorized into oxidative acids (e.g., nitric acid), non-oxidative strong acids (e.g., sulfuric acid), and non-oxidative weak acids (e.g., formic acid, carboxylic acid etc.). Likewise, the change of the particle size, particle morphology, and composition after functionalization/de-alloying may be affected by various methods disclosed herein and, in various embodiments, may affect the stability of the base metal (e.g., Ni, Co etc.) upon the membrane electrode assembly (MEA) conditioning and cycling.

Additionally, a post annealing or heating may be used to help promote the formation of a metal rich (e.g., Pt-rich) passivation shell layer for preventing the leaching of the base metals. While a person of ordinary skill with the benefit of this disclosure may recognize that various thermal treatments at 400° C. might cause the cleavage of covalently bonded functional groups (e.g., whose thermal stability is up to ~480° C.), it was discovered that in this regard, surface functionalization may be repeated—as desired for various applications—following thermal annealing to impart sufficient functionality and/or create an effective ionomer/catalyst interface in the catalyst layer of the MEAs. Without being limited to any theory, during the second functionalization, the formation of the passivation layer may help to prevent the loss of metal (e.g., Pt—Ni) from the inner cores in some embodiments.

Furthermore, the first functional groups and the functional groups of the ionomers (a portion of the ionized units) are not particularly limited and may include at least one of sulfonate, $SO_3^-$, carboxylate, $COO^-$, a tertiary amine, $NR_3^+$, where R is H, alkyl, aryl, or combinations thereof, polybenzimidazole (PBI), poly(ethylene oxide) (PEO), polyphenylene oxide (PPO), polyaniline (PANI), or mixtures thereof. Thus, various methods within the scope of this disclosure include methods where the substrate is functionalized with a second functional group and/or the ionomer may be functionalized with a plurality of ionomer functional groups.

In some embodiments, a second or more functional group may be added. In some embodiments the first and second functional groups may have a similar charge, or may have an opposite charge. The functional groups, in various embodiments, may include, at least one of

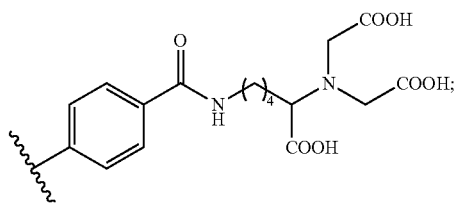

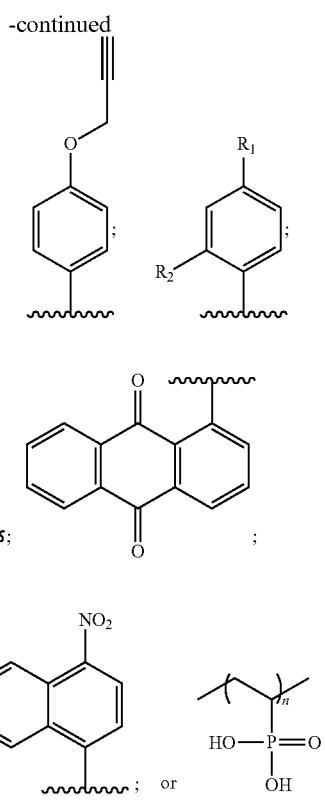

wherein $R_1$ is selected from the group consisting of $SO_3H$, COOH, $NH_2$, PANI, PBI, PEO, Cl, $CH_3$, $NO_2$, Br, $N(CH_3)_2$, $OCH_3$, OH, $CH_3$, H,

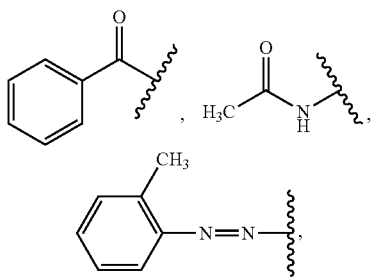

and $R_2$ is selected from the group consisting of Cl, $CH_3$, and H, and n is an integer from 1 to 10.

In some embodiments, the functional group of the substrate and the functional group of the ionomer, which may be the same or different than the first functional groups. In various embodiments, functional group of the functionalized substrate may be oppositely charged from the ionomer functional group.

Furthermore, methods may also include forming an ionomer film on either the metal, the substrate, or both. In various embodiments, forming an ionomer film may help to increase the catalyst utilization, improve the catalytic performance as well as improve surface particle dispersion, decrease surface migration, and/or improve diffusion of products/reactants, such as $O_2$.

Accordingly, a skilled artisan will recognize—with the benefit of the entire disclosure—that various methods may include modifying various properties of catalysts, such as surface charge and/or hydrophobicity. For example, various embodiments may include modifying the surface charge and/or the hydrophobicity with a diazonium reaction.

Various embodiments of methods 1, 10, 2, and 20 may include processes which yield a catalytic metallic nanoparticle having an average particle size distribution between about 10 nm to about 0.5 nm, between about 8 nm and 0.5 nm, between about 6 nm and 0.5 nm, between about 6 nm to about 1 nm, and between about 3 nm to about 2 nm. Without being limited to any theory, it is believed that methods which yield catalytic metallic nanoparticles distributed on the substrates may improve catalytic performance, prevent surface migration or agglomeration, and may yield more predictable life expectancy of the catalyst, for example, in a fuel cell.

Figure 3A:
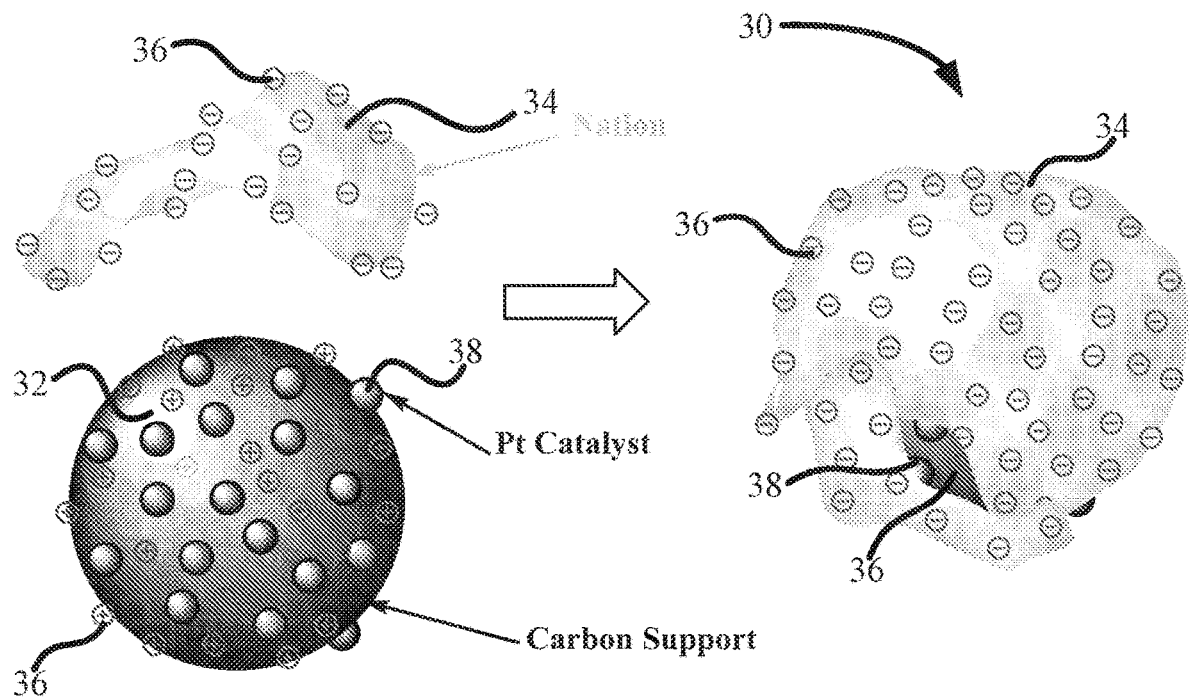
FIG. 3A is an illustrative view of the formation of a catalyst according to various embodiments.
Figure 3B:
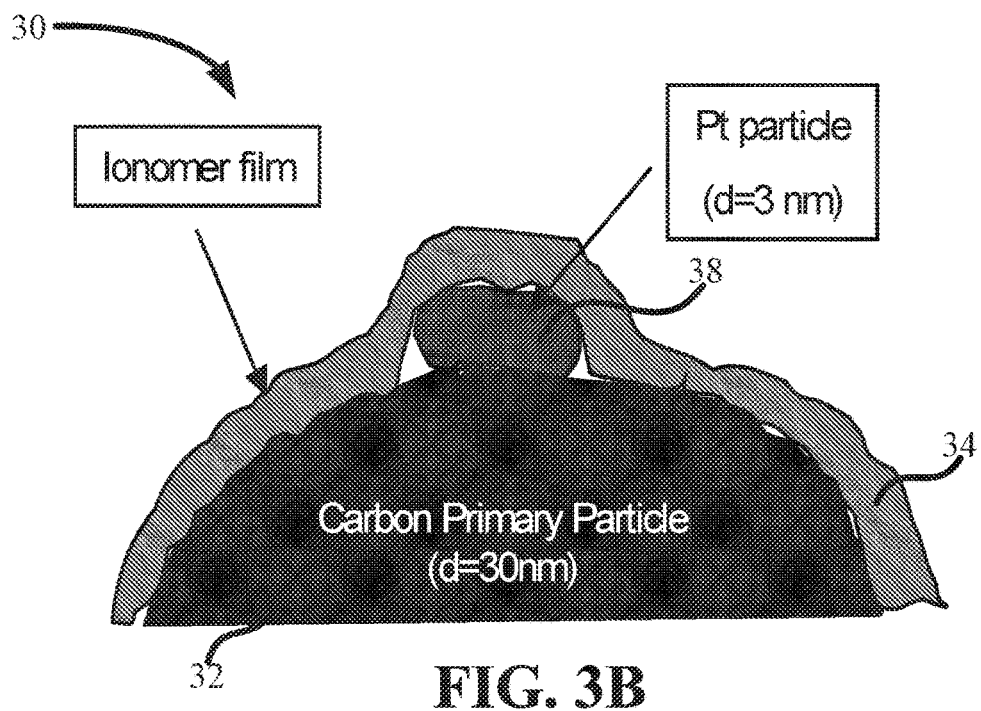
FIG. 3B is a cross-sectional view of a catalyst having an ionomer film according to various embodiments.

With reference to FIGS. 3A and 3B exemplary catalyst 30 is illustrated, with FIG. 3B illustrating the local structure of the catalyst/ionomer interface. Catalyst 30 may include a substrate 32 (e.g., graphene, a carbon-based nano-sphere, a carbon-based nano-tube) and a metal 38 dispersed on and/or throughout the substrate 32. Metal 38 is not particularly limited and may be any catalytic metal. Thus, various metals may include at least one of Pt, Rh, Pd, Ag, Au, Ni, Os, Ir, Mn, Co, alloys thereof, oxides thereof, or mixtures thereof. For example, the metal may comprise Pt and Ni, such as a Pt—Ni alloy.

The ionomer 34 (e.g., Nafion ionomer) may be any known ionomer or ionomer hereafter developed. Ionomer 34 may comprise an ionomer functional group 36, which, although exemplified in FIG. 3A as being negatively charged, may be any charge (e.g., negatively or positively charged). Moreover, specific ionomers and first charged functional groups may be selected based on various properties, for example, their respective charges. For example, in various embodiments the first charged functional group may be positively or negatively charged, while the ionomer functional may be negatively or positively charged respectively. Without being limited to any theory, it is believed that in some embodiments having a first functional group with a charge that is opposite of the charge of the ionomer functional group may allow the formation of an interface of ionomer and catalyst/substrate with substantial or near complete ionomer coverage on the surface of catalyst and substrates for increased catalyst utilization and catalytic performance. Utilizing the different charges (e.g., positive charge on catalyst and/or substrates and negative charge on ionomer), the ionomer/catalyst and/or substrates interface may be manipulated to control the ionomer coverage and the thickness of the ionomer film over catalyst and substrates in various embodiments.

In some embodiments, substrate may include a second charged functional group (not shown), or any plurality of charged functional groups. In some embodiments, the second charged functional group may have an opposite charge orientation from the first functional group (e.g., the first charged functional group could be negatively charged and the second functional group could be positively charged). In some embodiments, the second charged functional group may have a similar charge orientation (both may be positively charged or both may be negatively charged). In some embodiments, the second charged functional group may be grafted onto the carbon support.

Similarly, in some embodiments, ionomer 34 may include a second ionomer functional group (also not shown), or any plurality of ionomer functional groups. In some embodiments, the second ionomer functional group may have an opposite charge orientation from the first ionomer functional group (e.g., the first ionomer functional group could be negatively charged and the second ionomer group could be positively charged). In some embodiments, the second ionomer functional group may have a similar charge orientation (both may be positively charged or both may be negatively charged).

Figure 4A:
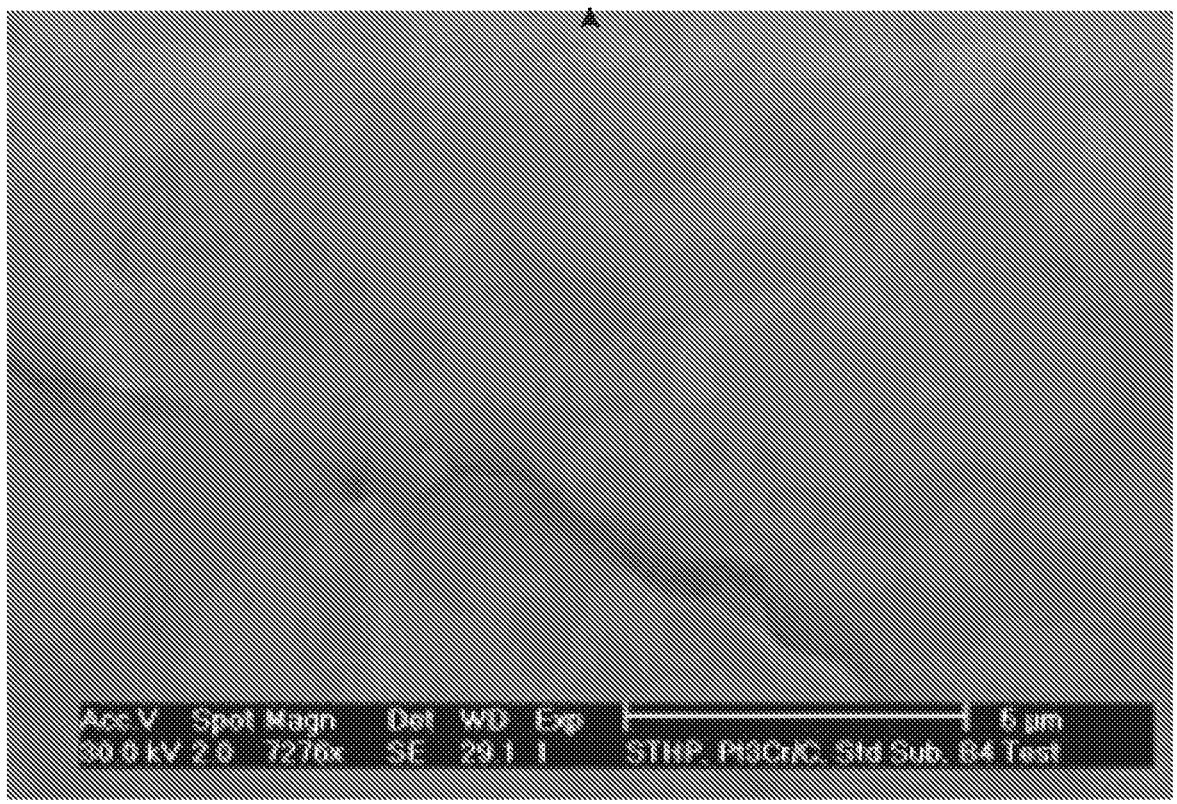
FIGS. 4A and 4B are transmission electron microscopy ("TEM") images of catalysts having an ionomer according to various embodiments.
Figure 4B:
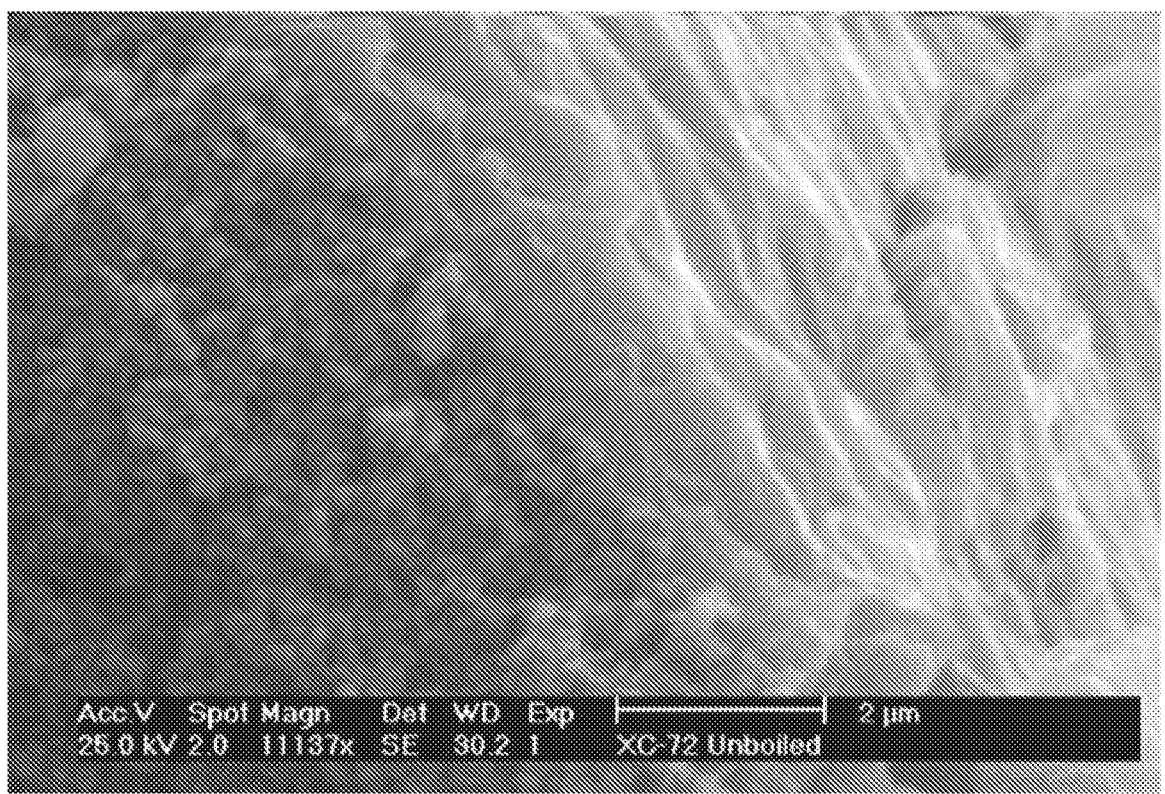

In some embodiments, the ionomer may form a film that may cover (coat) at least a portion of the carbon particle and/or the metallic particle, like the thin film shown in FIGS. 3A and 3B. FIGS. 4A and 4B, show an ionomer coating a portion of the catalyst layer surface in a membrane electrode assembly ("MEA"). More specifically, FIG. 4A illustrates a substantially orthogonal view (a substantially normal view). FIG. 4B illustrates an oblique view (where the cross-section of the catalyst layer with a ionomer film can be seen clearly) of the coated MEA according to various embodiments. As can be seen in FIGS. 4A and 4B the coating may substantially cover a surface of a catalyst layer in the MEA.

EXAMPLES

Carbon Substrates

As described above, the substrate is not particularly limited. In various embodiments, chemical groups were covalently grafted onto the surfaces of the carbon blacks (CBs), graphene (G), graphene tube (GT), graphite and nano-graphite particles and carbon particles (as spacers). In various embodiments, the grafting of the chemical groups was performed to help modify the surface properties of the carbon substrate through a diazonium reaction.

In the diazonium reaction, the functional group "Y" was attached onto the graphene (G)/carbon black surface through diazonium salt XN2C6H4-Y ((e.g., Y was Sulfonate, $SO_3^-$ $M^+$, but could, in various aspects or embodiments, be carboxylate, $COO^-M^+$; a tertiary amine, $NR_3^+X^-$; and polymer groups, PBI, PEO, PPO, PANI, etc.).

The diazonium reaction-based functionalization was found to be a simple and cost effective way to transform the pure G/carbons into hierarchical and functional materials that can provide the desired properties (i.e. hydrophobicity, $H^+/e^-$ conductivity, PGM particle dispersion and anchoring, etc.) for catalyst supports as described below. In addition, such a method was found to be easy for large-scale manufacturing.

Hydrophobicity/Hydrophilicity of Carbons/Graphenes

The CBs, particular, annealed CBs, graphitic carbons (GCs), GTs and pure G sheet was highly hydrophobic (due to lacking O- or OH-containing groups), while functional groups can make them highly hydrophilic. It was found that pure G either floated on the top or settled down at the bottom of the water, while functionalized graphene (f-G) dispersed well in the water (no settling after 7 months). High hydrophilicity of the catalyst support may allow for various ink formulations. According to various embodiments, the G hydrophobicity may be tuned using different functional groups. Thus, one of ordinary skill in the art with the benefit of this disclosure can functionalize carbon blacks by attaching charged functional groups (e.g., —$SO_3^-H^+$ or —$COO^-$ $H^+$ or —$NH_2$) and, thus, can optimize or tune the hydrophilicity of the support based on applications or design parameters. The change in the hydrophilicity/hydrophobicity of the carbon surface of XC72 CBs with different functional groups is illustrated in FIG. 9, where the surface energy of the carbon/water interface was measured using dynamic water vapor sorption (DVS). Without being limited to any theory, the higher the surface energy, the higher the hydrophilicity of the carbon for water was found to be in the exemplified embodiments. This high affinity may help the carbon primary particles (e.g., 40 nm diameter for XC72) to form small aggregates in the water. The —$SO_3H$ and —COOH groups made the carbon and corresponding Pt/FCB catalyst more hydrophilic while —$NH_2$ group makes them less hydrophilic.

The surface energy may be modified defending on desired properties. For example, the surface energy may be modified from about 20 $mJ/m^2$ to about 400 $mJ/m^2$, from about 20 $mJ/m^2$ to about 300 $mJ/m^2$, from about 100 $mJ/m^2$ to about 250 $mJ/m^2$, and from about 200 $mJ/m^2$ to about 250 $mJ/m^2$.

Formation of Ionomer/Catalyst Interface

An exemplary Nafion ionomer—according to various embodiments—was placed in water (polar solvent with di-electric constant, $\epsilon$=80.4) and was shown to have a rod-like shape (d=3 nm and L=120 nm) with an ionic domain (—$SO_3^-H^+$) on the surface characterized by an exemplary method of combining ultra-small angle x-ray scattering ("USAXS") and cryo-TEM and others.

In a water based ink, it was found that the rod-like ionomer particles with —$SO_3^-$ (from dissociation of —$SO_3^-$ $H^+$ in water) on the surface did not absorb on the surface of —$SO_3^-H^+$ functionalized carbon. Without being limited to any theory, this was believed to occur because of the charge repelling (—$SO_3^-$ on both the ionomer and carbon surface) (exemplified in FIG. 3A) and the ionomer film was formed during the solvent evaporation process. However, it was found that in some embodiments, the ionomer particles were absorbed on a positive charged surface of —$NH_2$ functionalized carbon particles due to the charge attraction (positive charged —$NH_3^+$ (from dissociation of —$NH_2$ in water) with negative —$SO_3^-$) and a uniform ionomer film is formed over the carbon surface (illustrated in FIG. 3B). This was demonstrated on the interaction of ionomer and carbon in solvent (1:4 $H_2O$:IPA) using USAXS and cryo-TEM.

It was found that the $NH_2$—XC72 had a significant increase on aggregate size after Nafion ionomer addition than that of $SO_3H$—XC72 (87.1% vs. –13.5%) (illustrated in FIG. 8 summarizing the different carbon particle size changes after addition of Nafion ionomer particles measured by USAXS).

Figure 5A:
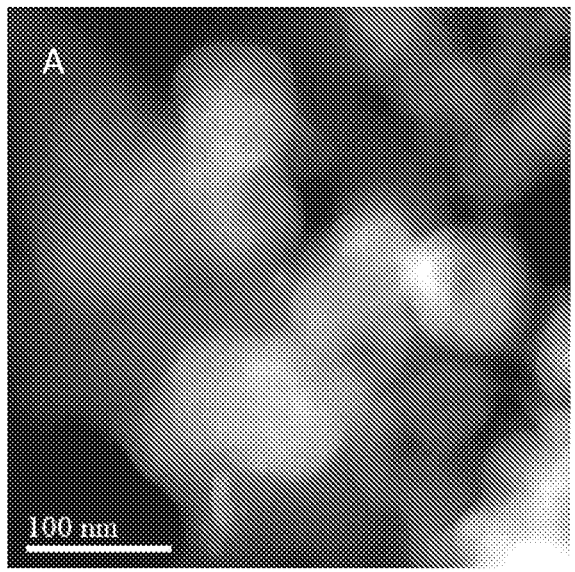
FIGS. 5A-5D are TEM images of Pt nanoparticles dispersed in a functionalized graphene sheet.
Figure 5B:
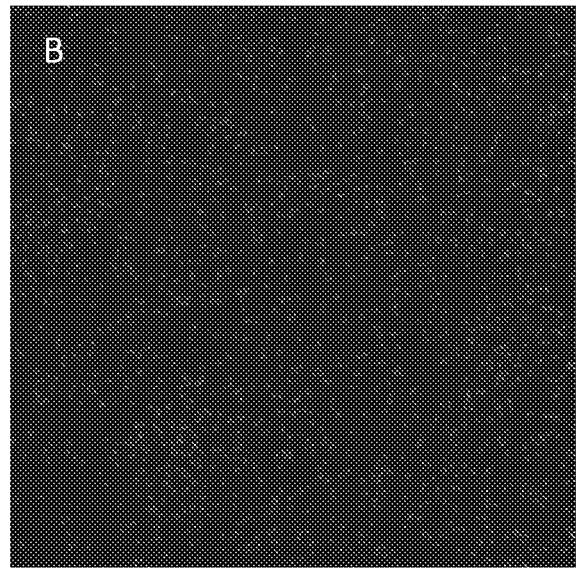
Figure 5C:
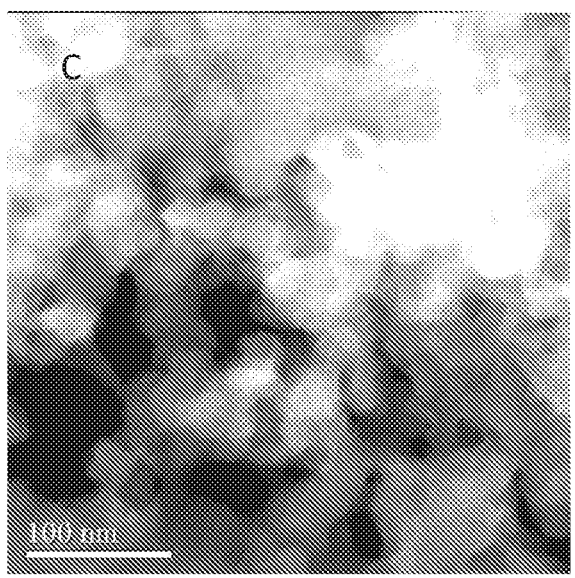
Figure 5D:
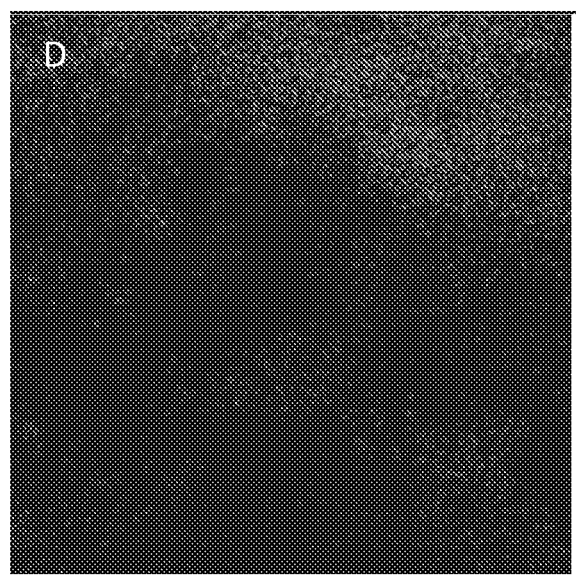
Figure 6A:
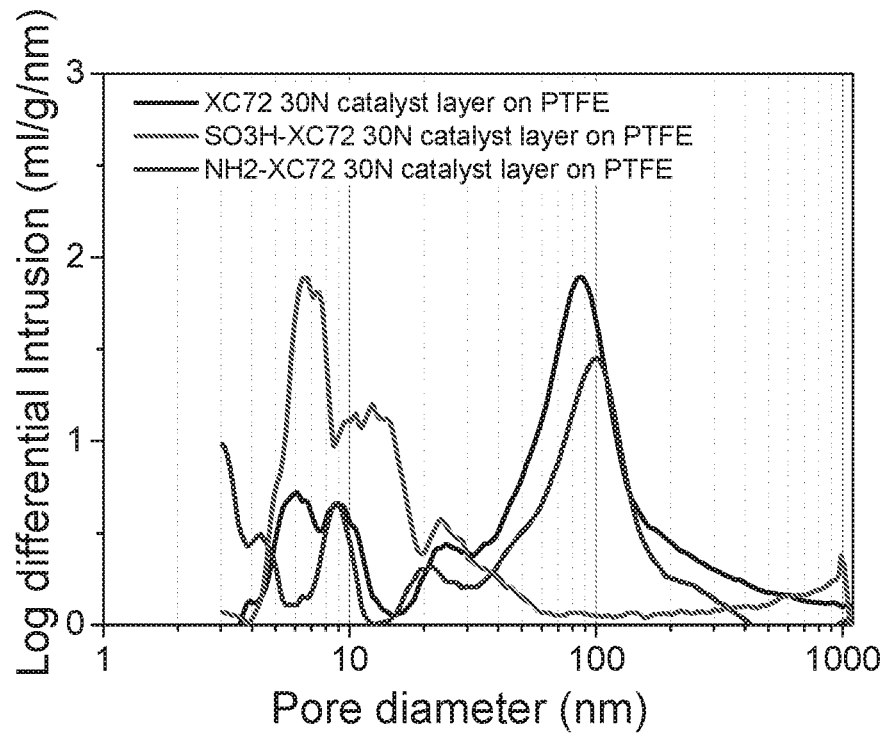
FIGS. 6A and 6B illustrate Hg porosimetry pore size distributions of various catalysts.
Figure 6B:
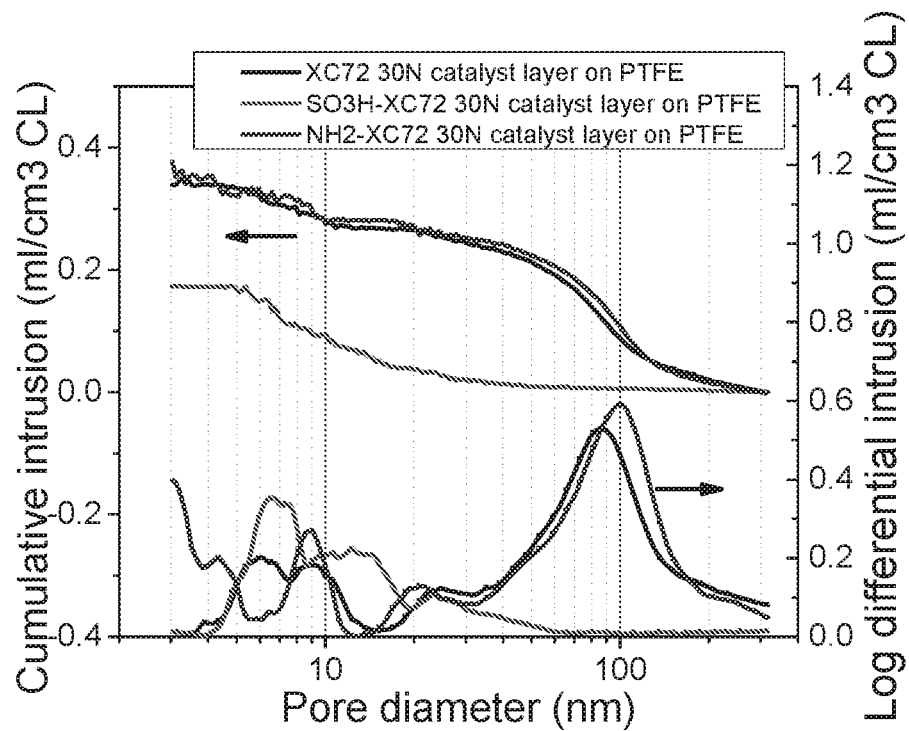
Figure 7A:
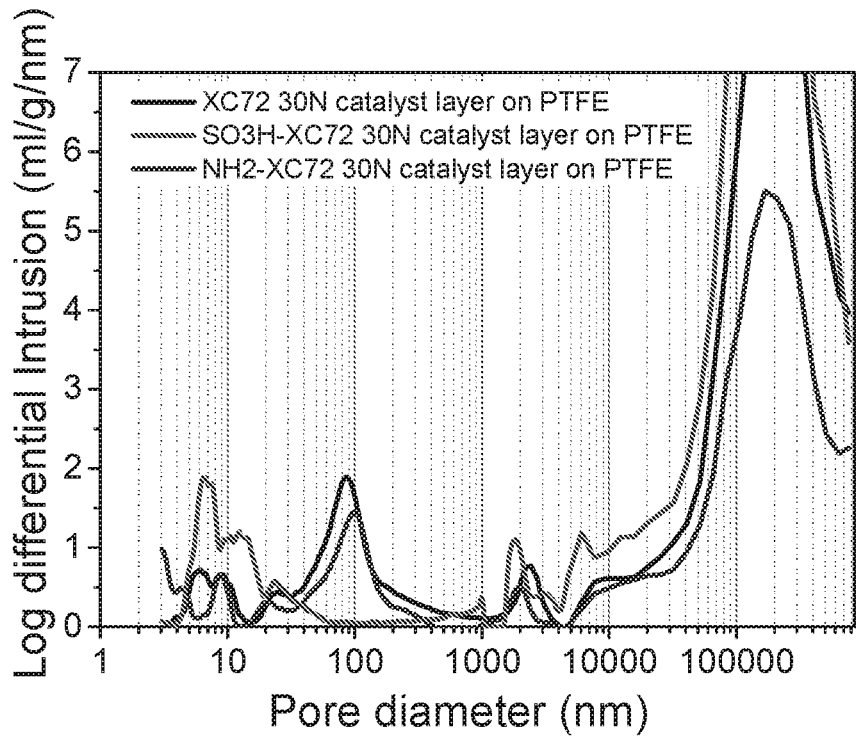
FIGS. 7A and 7B illustrate Hg porosimetry pore size distributions of various catalysts.
Figure 7B:
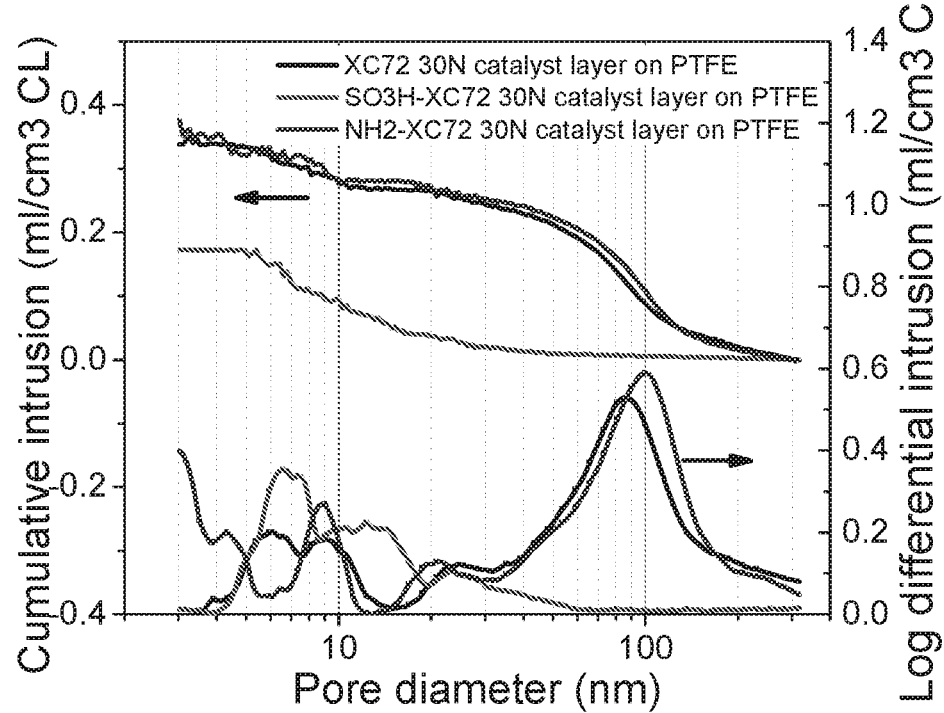
Figure 21:
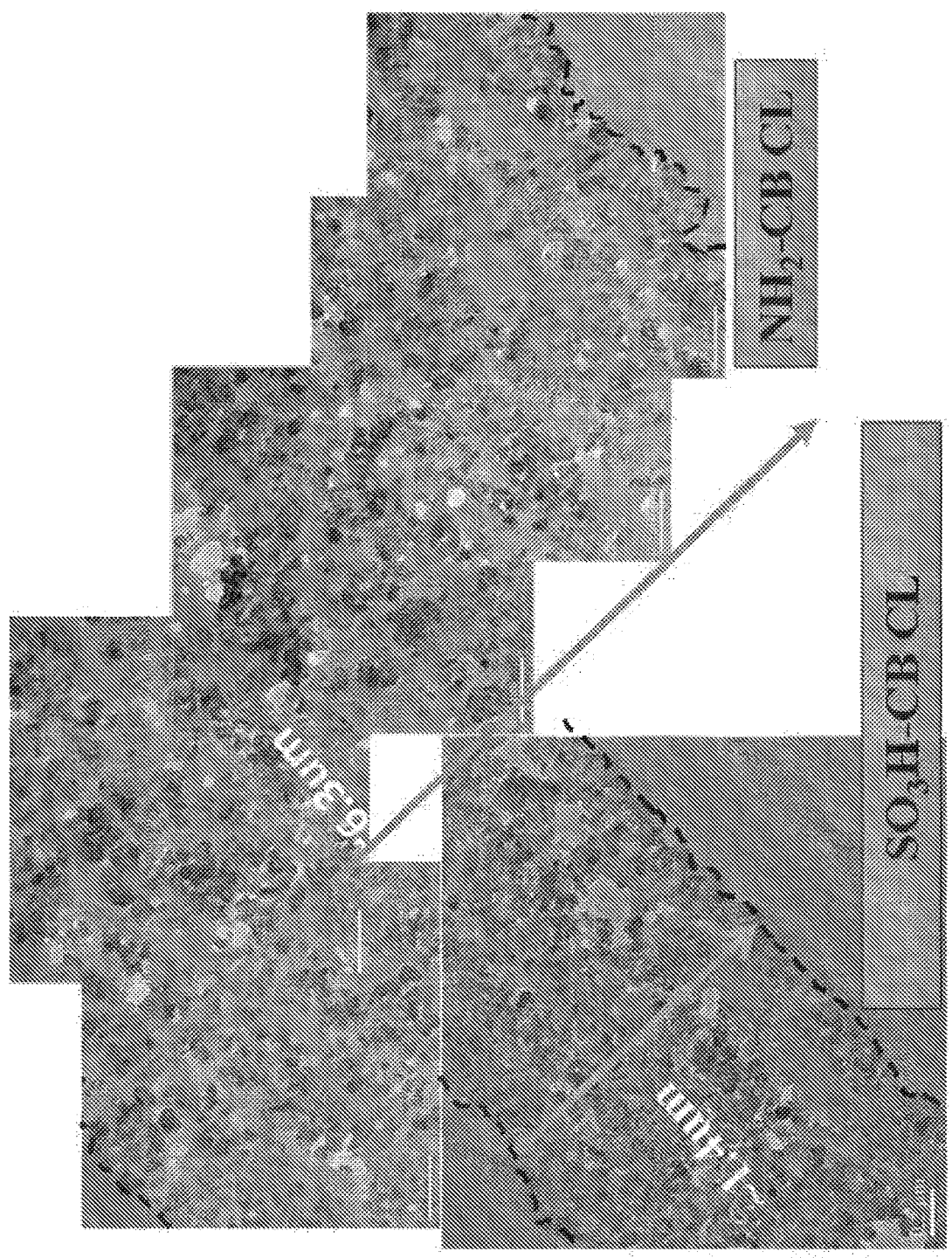
FIG. 21 depicts TEM images of two CB-CL in combination with either $SO_3$ or $NH_2$ Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

Without being limited to any theory, the decreased size for $SO_3H$—XC72 may suggests that ionomer does not absorb on $SO_3H$—XC72 but serves as surfactant to help $SO_3H$—XC72 dispersion. TEM work on the catalyst layer made of $NH_2$—XC72 and $SO_3H$—XC72 showed the more uniform ionomer coverage on $NH_2$—XC72 than that of $SO_3H$—XC72. For example, FIGS. 5A and 5C illustrate STEM images of a cross-section of a catalyst layer of $NH_2$—XC72 and $SO_3H$—XC72 respectively, while FIGS. 5B and 5D illustrate EDS mapping of F. With reference to FIGS. 5B and 5D, because the Fluorine (F) -EDS mapping in $NH_2$—XC72 layer was more uniform (FIG. 5B) than that in $SO_3H$—XC72 (F is from the Nafion ionomer), it was believed that there was more uniform ionomer coverage (coating). The high F:C atomic ratio of $SO_3H$—XC72 (1:10) over that of $NH_2$—XC72 (1:125) indicated that this exemplary Nafion layer over $SO_3H$—XC72 was significantly thicker than that of $NH_2$—XC72. It was also observed that $NH_2$—XC72 layer was significantly more porous than $SO_3H$—XC72 layer with 5× thickness, as can be seen in FIGS. 20 and 21. MEAs made with $NH_2$—XC72 functionalized carbon-supported Pt catalyst show significant improvement on ECSA, mass activity and limiting current density over that made with XC72; while some exemplary MEAs made with $SO_3H$—XC72 supported Pt catalyst showed decreased performance.

In view of these results and without being limited to any theory, the ionomer film can be formed in a "controlled way" over carbon surface, which lead to a high coverage and maxim ionomer/catalyst interface. According to various embodiments, the ionomer/catalyst interface may be tailored or modified according to desired specifications. For examples, in some embodiments, the ionomer/catalyst interface may be optimized by altering the dispersion of ionomer particles and carbon in a solvent. For example, XC72 particles are typically hard to disperse in water, but disperse much better in a water mixture (e.g., $H_2O:IPA=1:4$, $\epsilon H_2O=80.4$ and $\epsilon IPA=18.23$). Thus, by mixing different polar solvents, a person of ordinary skill with the benefit of this disclosure may adjust the polarity of the mixed solvent. Hence, the selection of appropriate solvent may be useful for various ink formulations. To enhance the electrostatic attraction, the charge strength and charge density of functional group (e.g. $NH_4^+>-NH_3^+>PBI-H^+$) may also be considered and/or optimized—based on desired performance.

In various embodiments, ionomers may serve as binders to aid in binding catalyst particles to form a porous catalyst layer. In various embodiments, pore structures (pore size distribution and shape) may help provide highly efficient proton conduction and mass transport paths for reactant gas molecules (e.g., $H_2$ or $O_2$) arriving in the interface zones and product water molecules leaving the zones. For example, FIGS. 6A, 6B, 7A, and 7B illustrate the mercury (Hg) porosimetry characterization of different catalytic layers according to various embodiments. As can be seen. In FIGS. 6A, 6B, 7A, and 7B, the following was observed:

TABLE 1

Average Pore Size and Porosity

| | AVERAGE PORE DIAMETER (nm) | Porosity (%) |
|---|---|---|
| XC72 30N_CL | 191.4 | 33.8 |
| SO3H-XC72 30N_CL | 100.1 | 17.3 |
| NH2-XC72 30N_CL | 127.4 | 37.7 |

Table 1 contains the mercury (Hg) intrusion porosimetry (MIP) data for XC72 CB series on a PTFE substrate according to various embodiments. As can be seen, the porosity for $SO_3H$—XC72 experienced a smaller shift to the slightly larger poor size, while $NH_2$—XC72 had the highest porosity.

Accordingly, the various catalysts and methods disclosed herein permit various improvements over conventional catalysts and methods. For example, the methods disclosed herein allow for the control the surface charge and/or hydrophobicity (e.g., via a diazonium reaction). Furthermore, control of the metal dispersion (e.g., the platinum group metal (PGM) nanoparticle dispersion) over a carbon support utilizing the functionalized carbon surface (charge guided landing of Pt precursor ions over carbon surface) can allow for catalysts (e.g., catalysts in MEAs) having increased catalytic (e.g., Pt) surface area and increased mass activity.

Moreover, the enhanced binding of metal particles (PGM nanoparticles) over carbon support by the metal-carbon interaction of electrons may further improve catalyst stability according to various embodiments.

Also, the various methods disclosed herein may allow for the control of the dispersion of ionomer and catalyst particles in catalyst inks allowing for new and novel methods of manufacture. For example, various novel methods disclosed herein permit the construction of a novel ionomer/catalyst interfaces utilizing electrostatic attraction between ionomer particles and catalyst particles. In various embodiments, such interface can lead to a substantial ionomer coverage over metallic catalytic particles and a thin ionomer film, leading to increased mass activity and high current density performance respectively.

Thus, a person of ordinary skill, with the benefit of this disclosure, will appreciate the ability to form optimized catalyst interfaces. Without being limited to any theory, this may be carried out by forming a uniform and thin ionomer layer over the substrate (e.g., through dispersion of the ionomer particles and/or the metal catalytic particles) in various solvents. In some embodiments, this may be done simultaneously to achieve the desired sizes and/or geometries. In various embodiments or aspects, the surface charge strength and density of the substrate may be increased using different charge groups (e.g., $-NH_2$, etc.) and various polymer groups, for example, polymer with positive charges.

Moreover, a person of ordinary skill, with the benefit of this disclosure, will understand that the surface hydrophobicity of pore wall may be fine-tuned by (1) different functional groups over the substrate and/or by mixing the functionalized catalyst with various carbon-based particles that will not interfere with the ionomer/catalyst interface, but may change the catalyst layer hydrophobicity.

Figure 10:
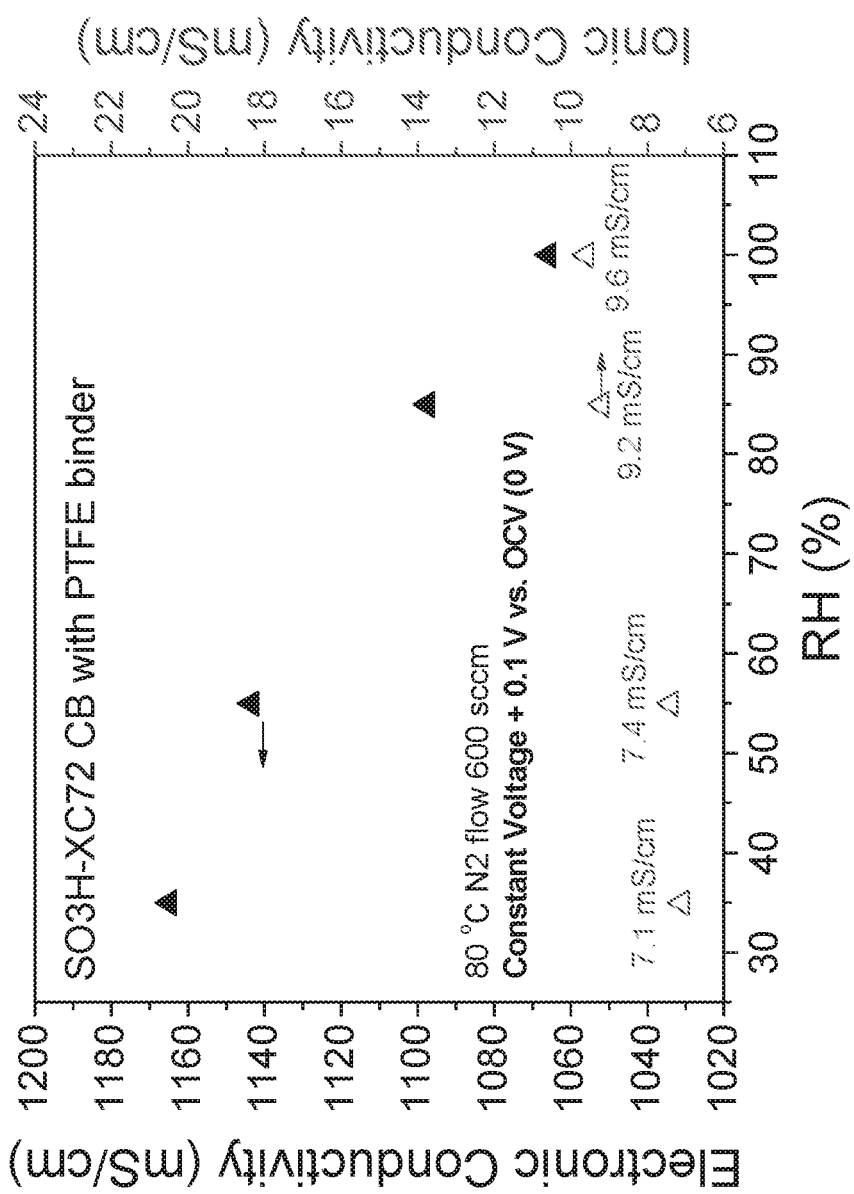
FIG. 10 illustrates the electronic and ionic conductivity change with respect to relative humidity of a catalyst comprising $SO_3^-$ charged functional groups according to various embodiments.
Figure 11:
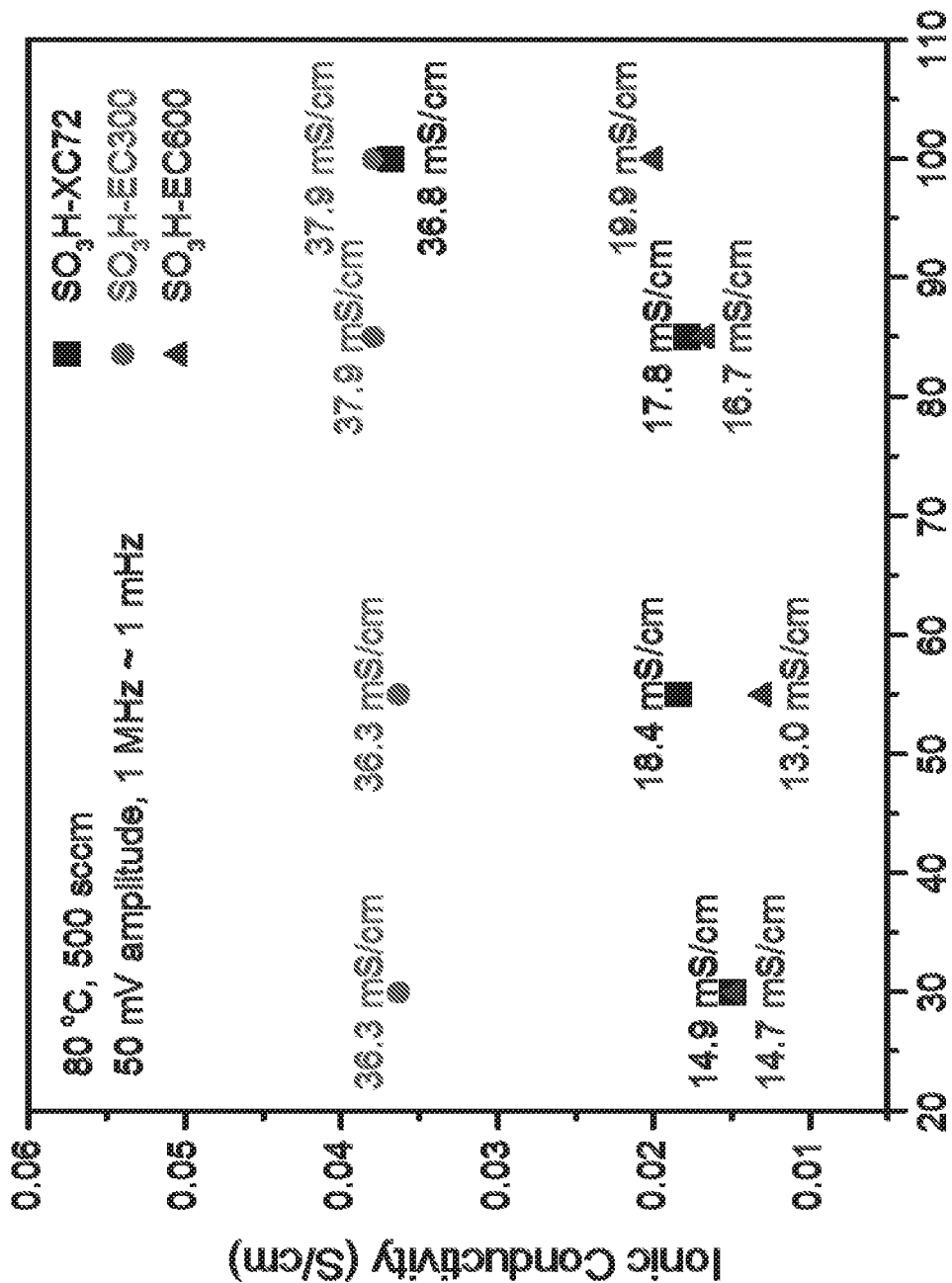
FIG. 11 illustrated fitted ionic conductivity comparison of various embodiments.

With reference to FIG. 10, electronic and ionic conductivity with respect to relative humidity is shown. As can be seen in FIG. 10, electronic conductivity decreased as relative humidity increased, while ionic conductivity increased as relative humidity increased. FIG. 11 illustrates how ionic conductivity can vary with the substrate.

FIG. 12 contains porosimetry data, including cumulative intrusion and total intrusion of various embodiments.

Figure 13:
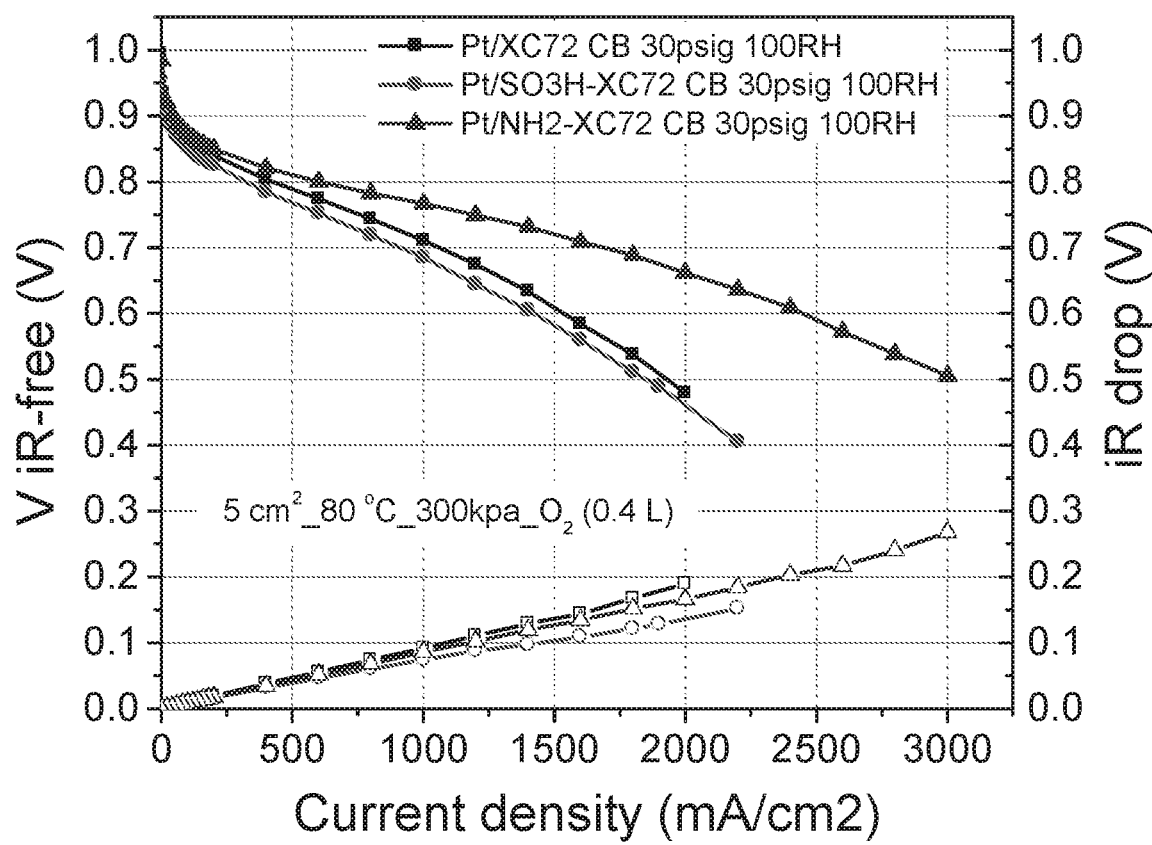
FIG. 13 shows voltage and current density data at 300 kPa.
Figure 14A:
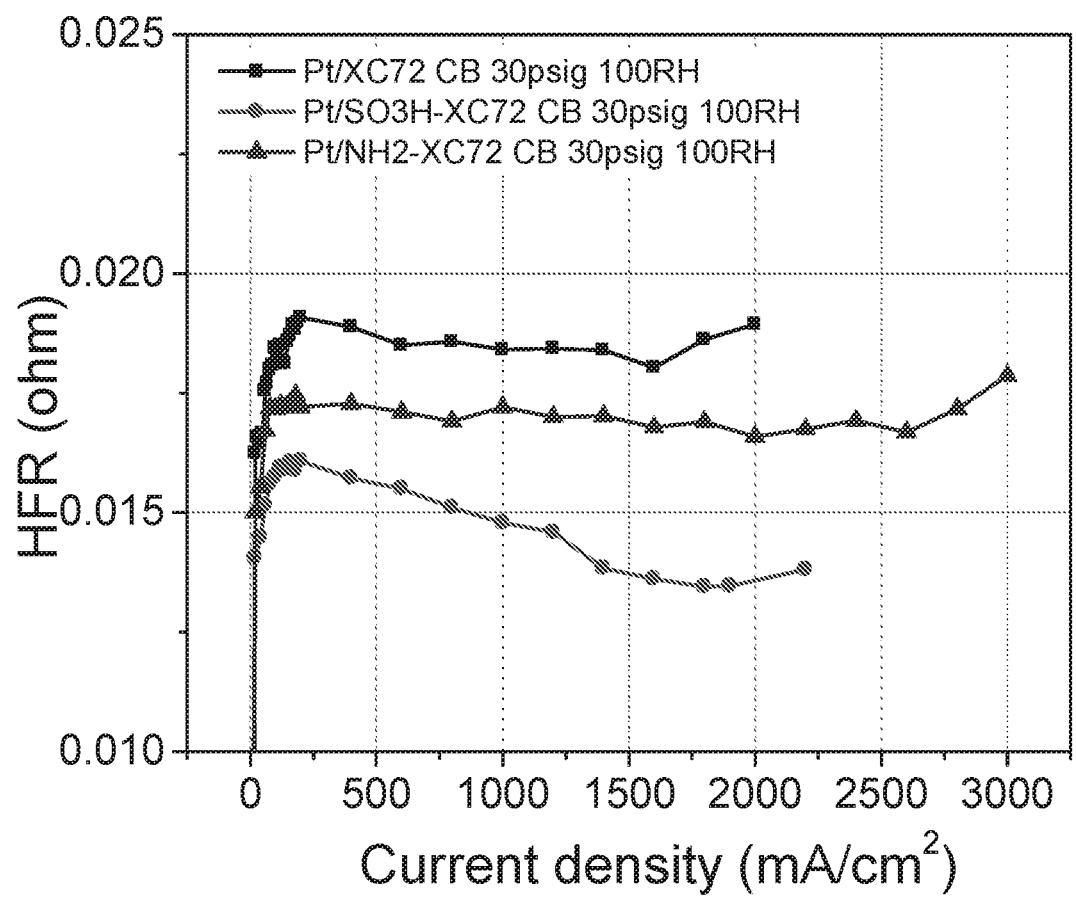
FIG. 14A shows high frequency resistance and current density data at 300 kPa.
Figure 14B:
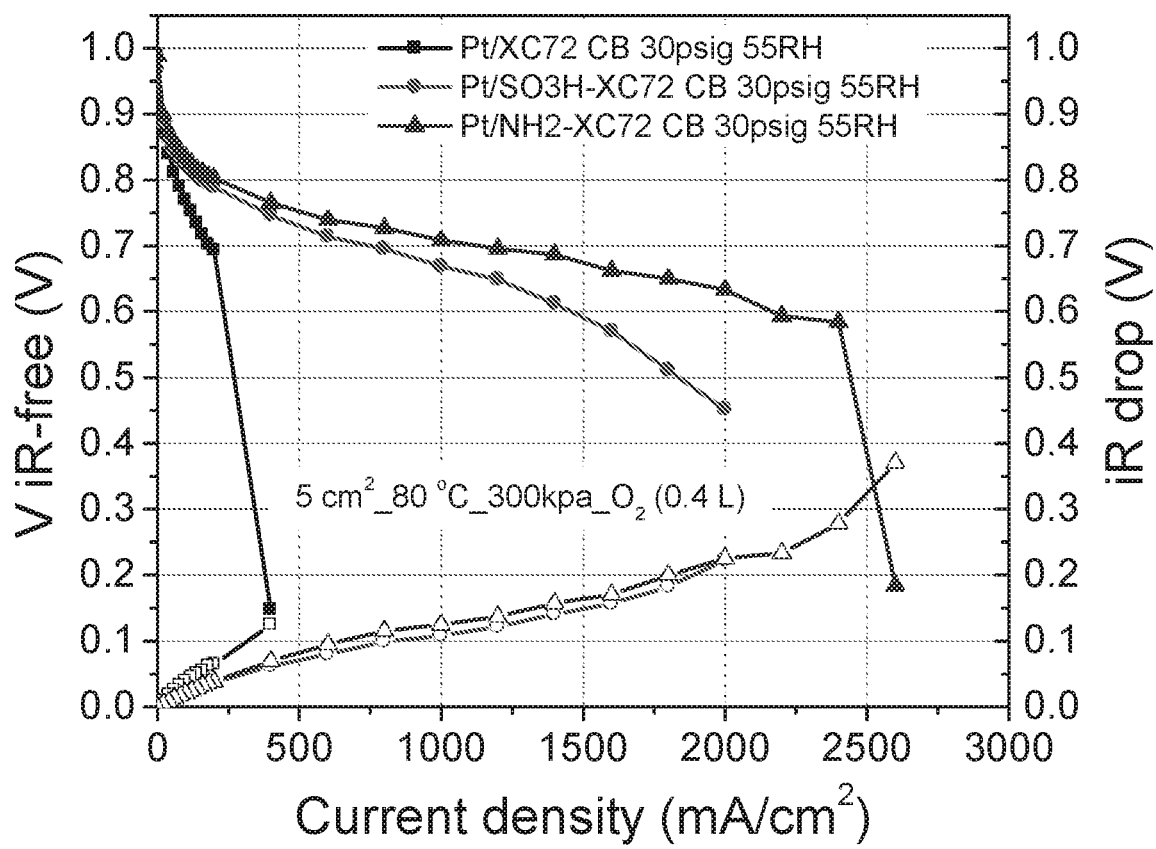
FIG. 14B shows voltage and current density data at 300 kPa.

FIGS. 13, 14A, and 14B illustrate data in an atmosphere of pure $O_2$ at 300 kPa, with FIG. 13 showing voltage and current density data at 300 kPa, FIG. 14A shows high frequency resistance and current density data at 300 kPa, and FIG. 14B shows voltage and current density data at 300 kPa.

Figure 15A:
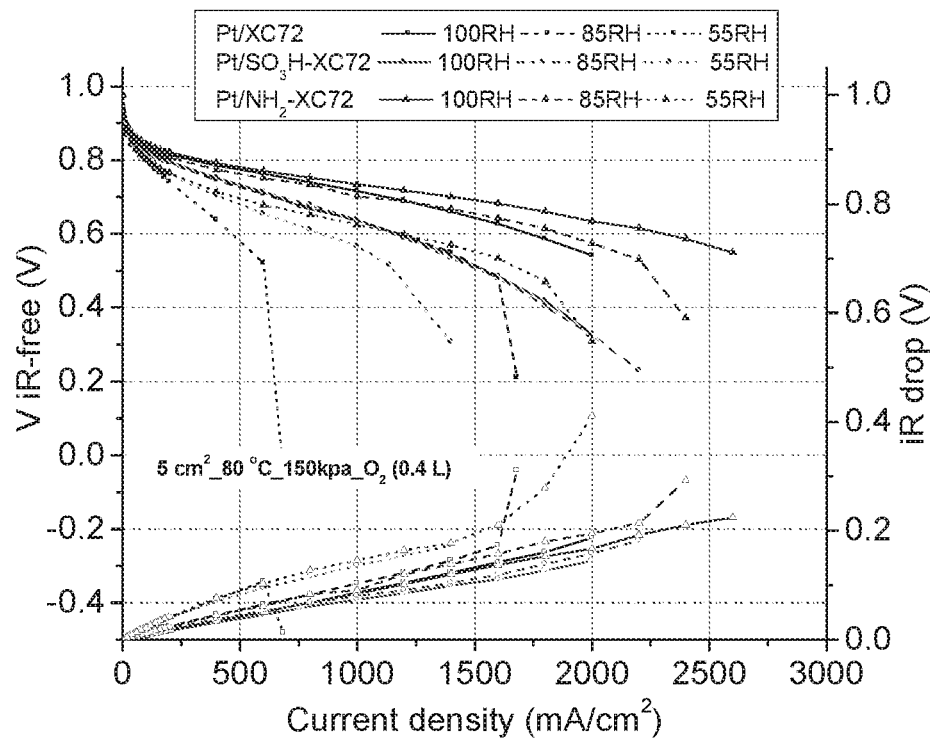
FIG. 15A shows voltage and current density data at 150 kPa.
Figure 15B:
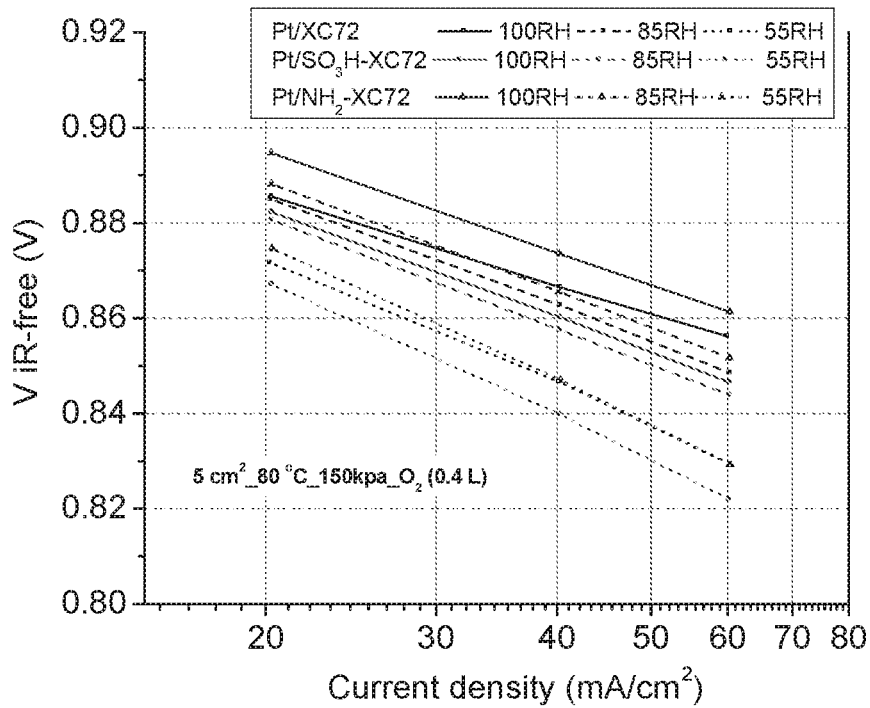
FIG. 15B shows high frequency resistance and current density data at 150 kPa.
Figure 15C:
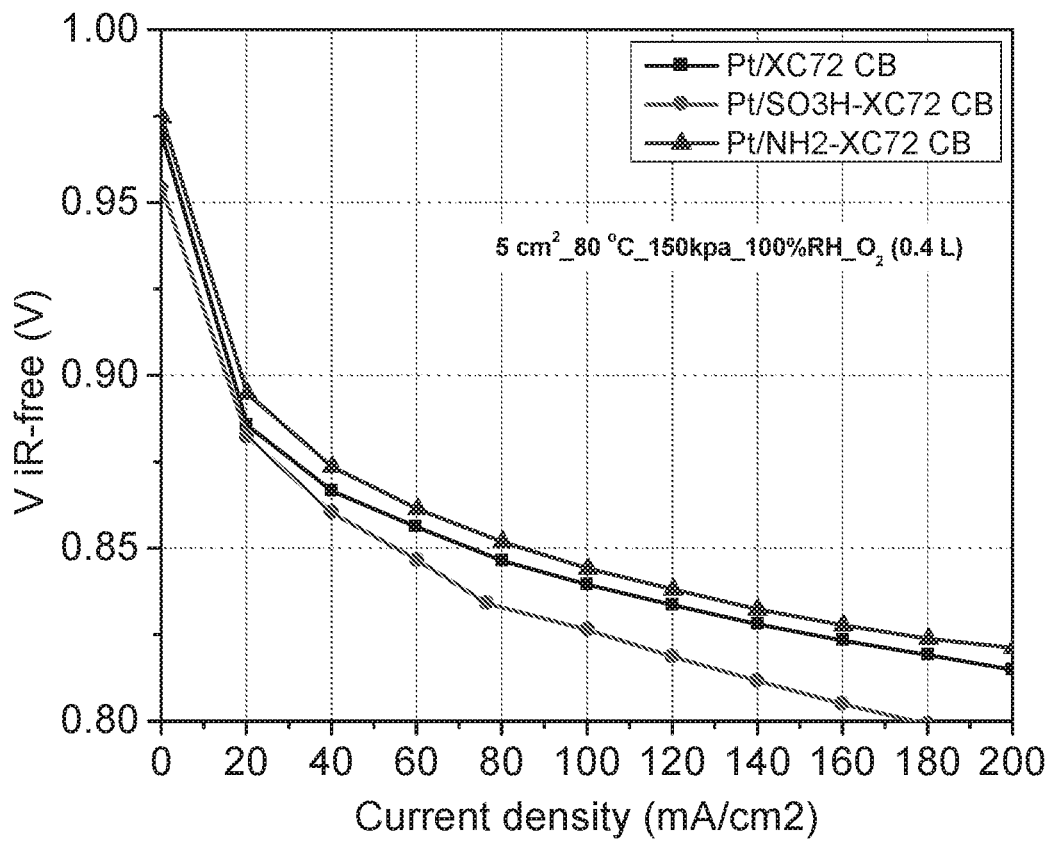
FIG. 15C shows voltage and current density data at 150 kPa.
Figure 15D:
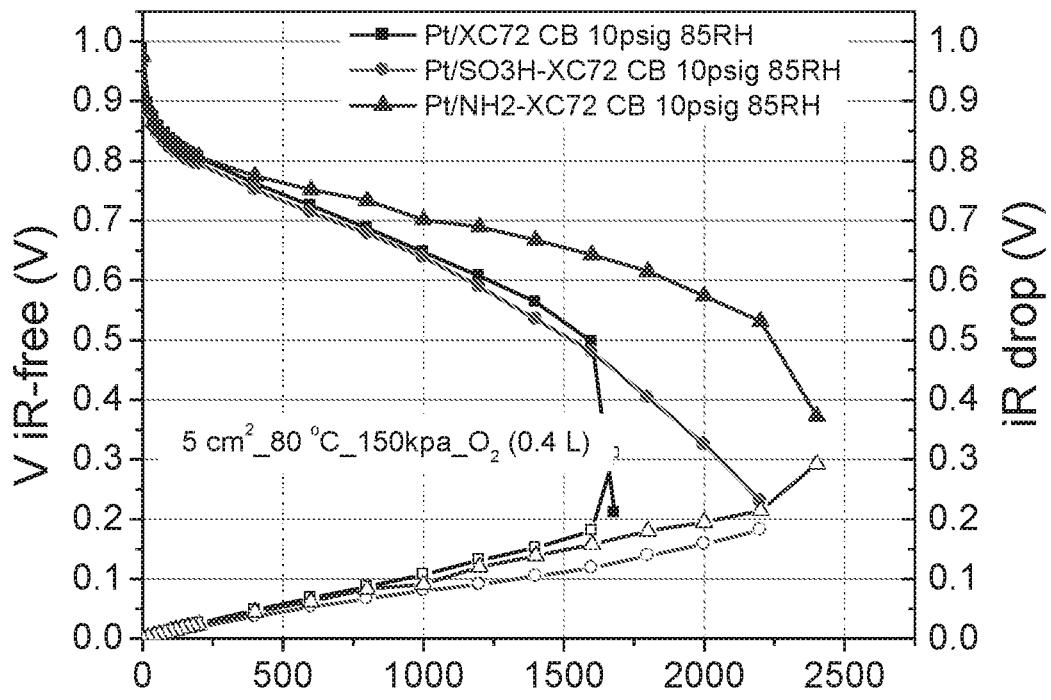
FIG. 15D shows voltage and current density data at 150 kPa

FIGS. 15A-D illustrate relative humidity data in an atmosphere of pure $O_2$ at 150 kPa, with FIG. 15A showing voltage and current density data at 150 kPa, FIG. 15B showing high frequency resistance and current density data at 150 kPa, FIG. 15C showing voltage and current density data at 300 kPa at a relative humidity of 100%, and FIG. 15D showing voltage and current density data at 300 kPa at a relative humidity of 85%.

Figure 16A:
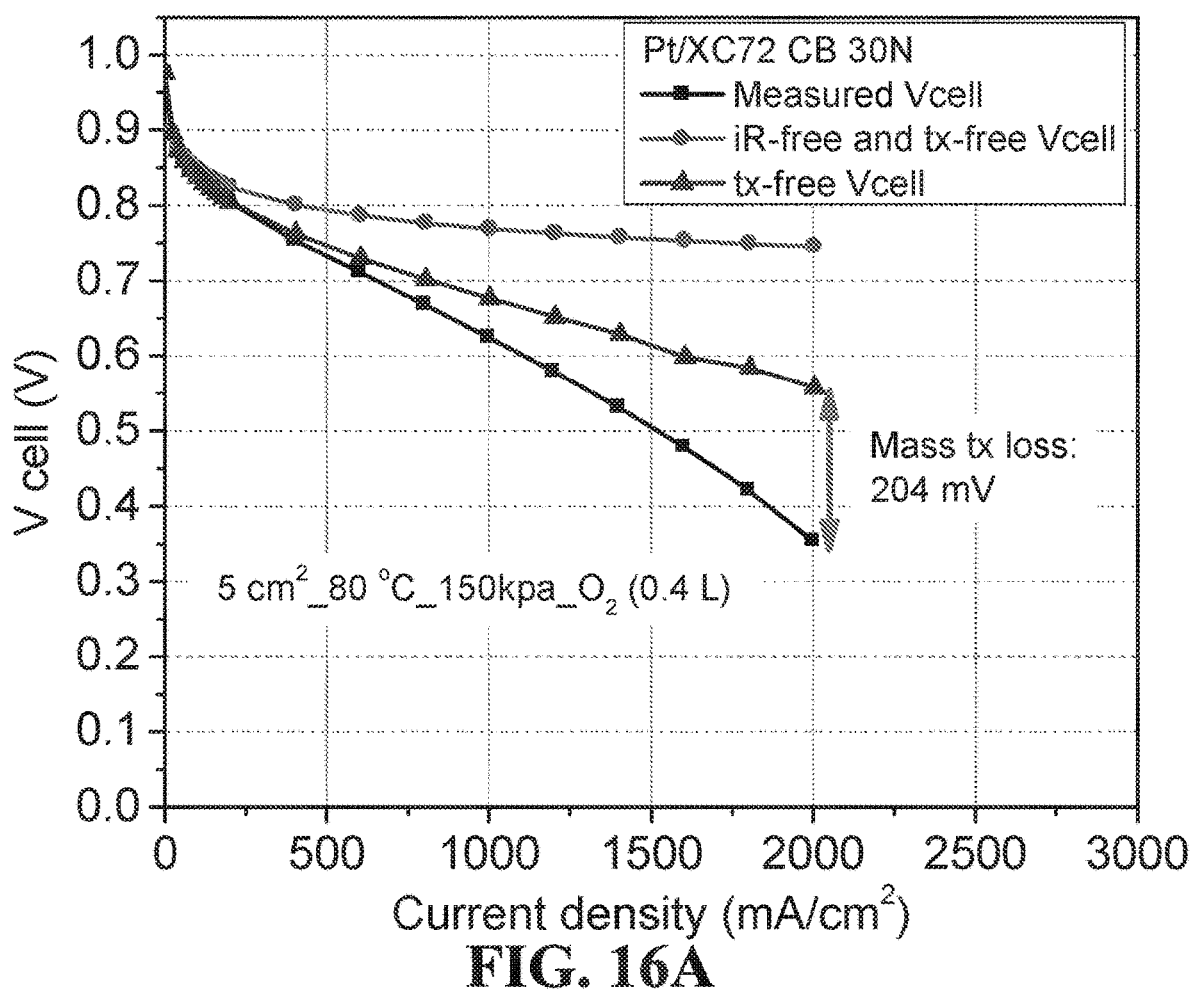
FIG. 16A-C show MEA current density (2.0 A/cm²) data and V-I polarization curves of Pt/XC72 CB 30 N, PT/SO₃—XC72 CB 30N, and Pt/NH₂—XC72 CB 30N respectively.
Figure 16B:
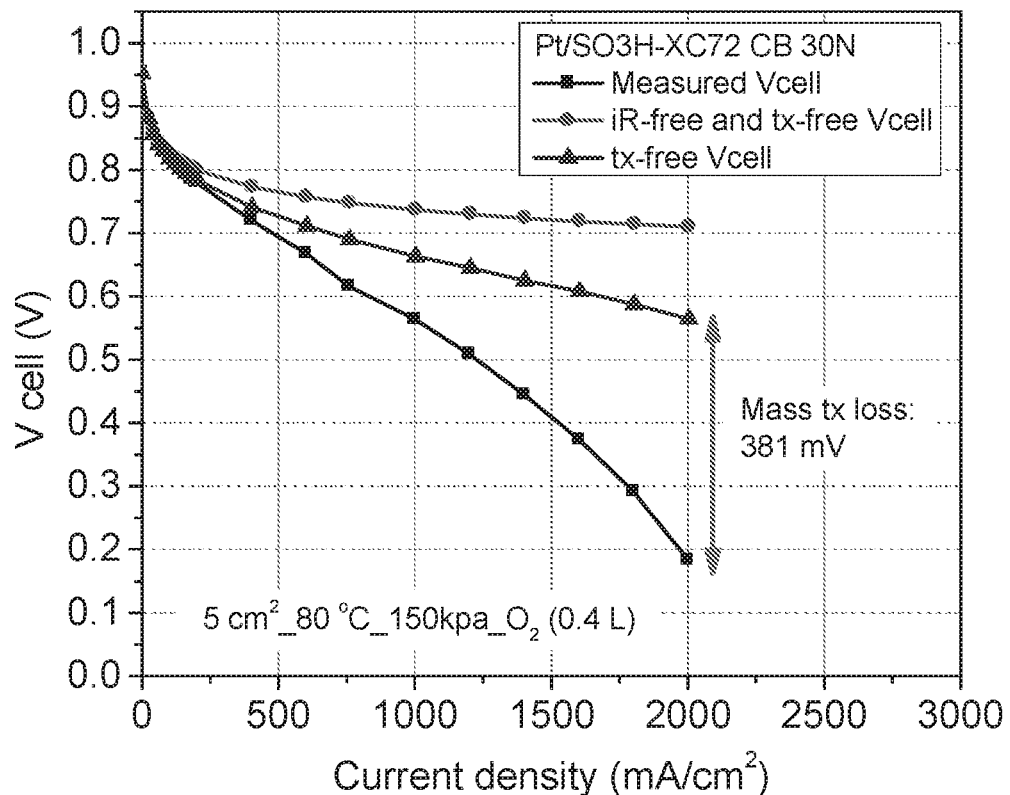
Figure 16C:
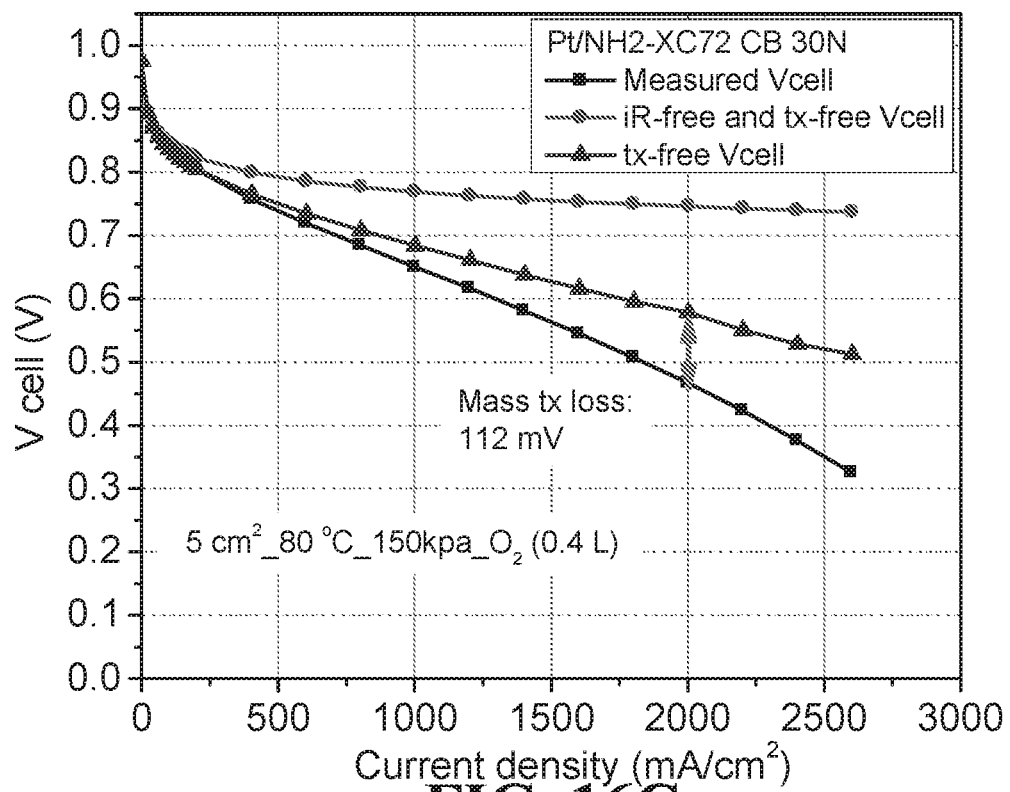

FIGS. 16A-C contain MEA current density (2.0 A/cm$^2$) data and V-I polarization curves of Pt/XC72 CB 30 N, PT/SO$_3$—XC72 CB 30N, and Pt/NH$_2$—XC72 CB 30N respectively (30N refers to 30% Nafion ionomer in the catalyst layer). As can be seen in FIGS. 16A-C, the MEA embodiment with Pt/NH$_2$—XC72 CB 30N was shown to have the least mass transport loss.

Figure 17A:
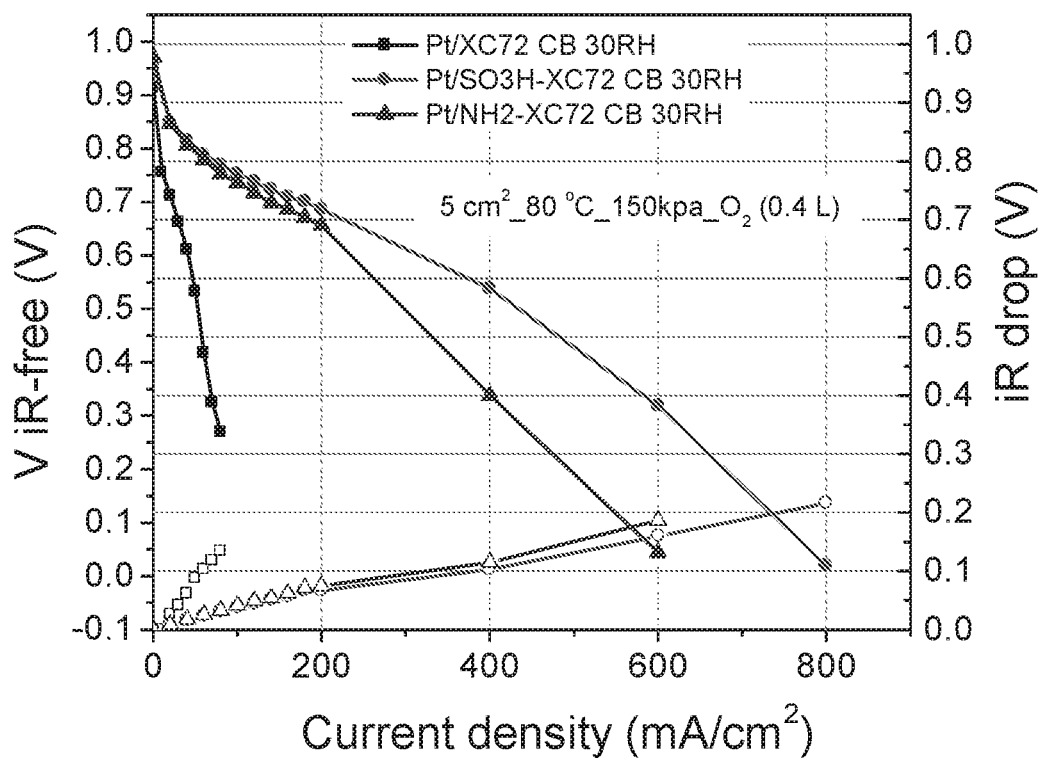
FIG. 17A shows voltage and current density data at 30% relative humidity.
Figure 17B:
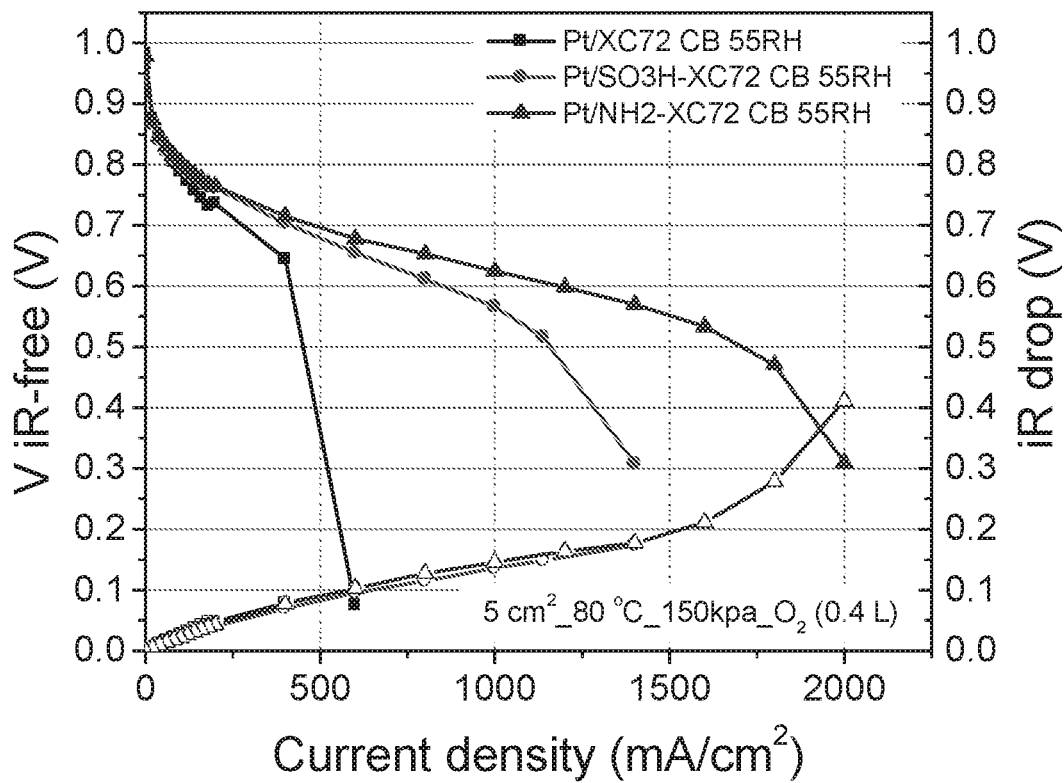
FIG. 17B shows voltage and current density data at 55% relative humidity.

With reference to FIGS. 17A-17B, voltage and current density data in an atmosphere of pure $O_2$ at 150 kPa at relative humidity values of 30% and 55% are shown respectively.

Figure 18A:
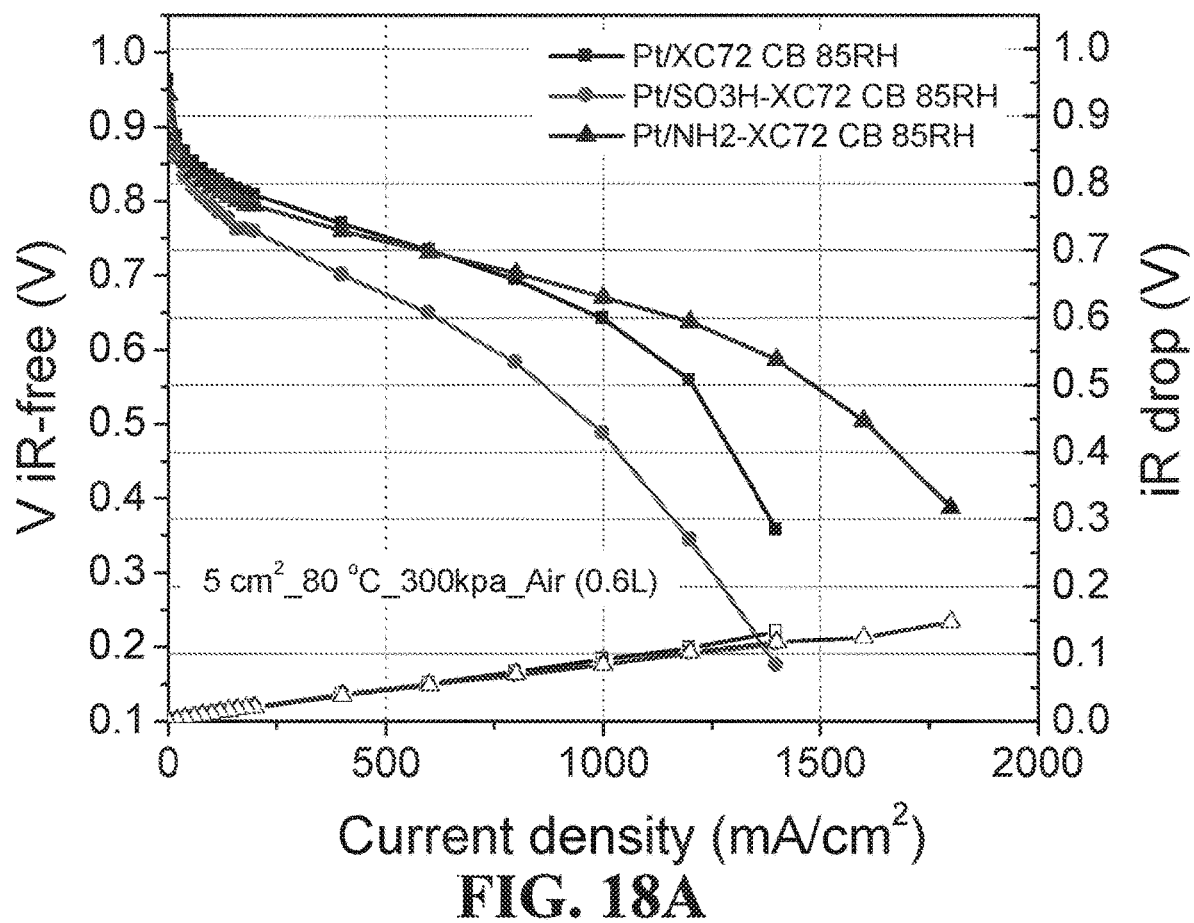
FIG. 18A shows voltage and current density data at 85% relative humidity in an atmosphere of air at 300 kPa.
Figure 18B:
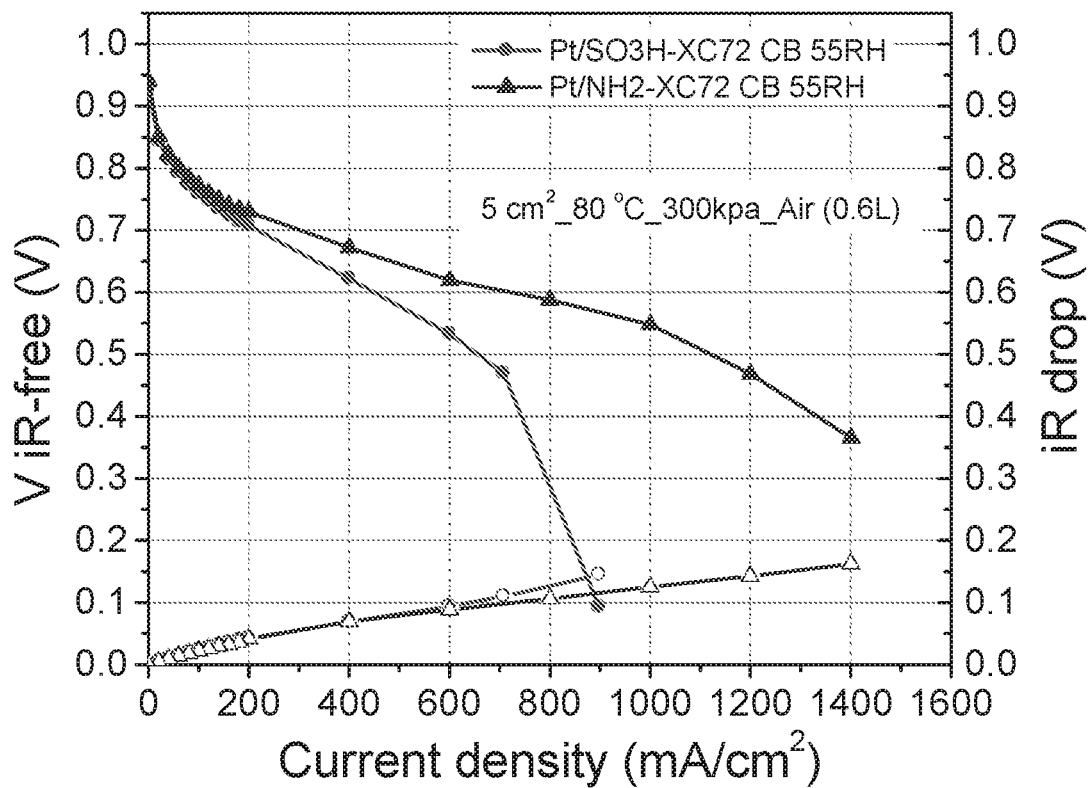
FIG. 18B shows voltage and current density data at 55% relative humidity in an atmosphere of air at 300 kPa.
Figure 18C:
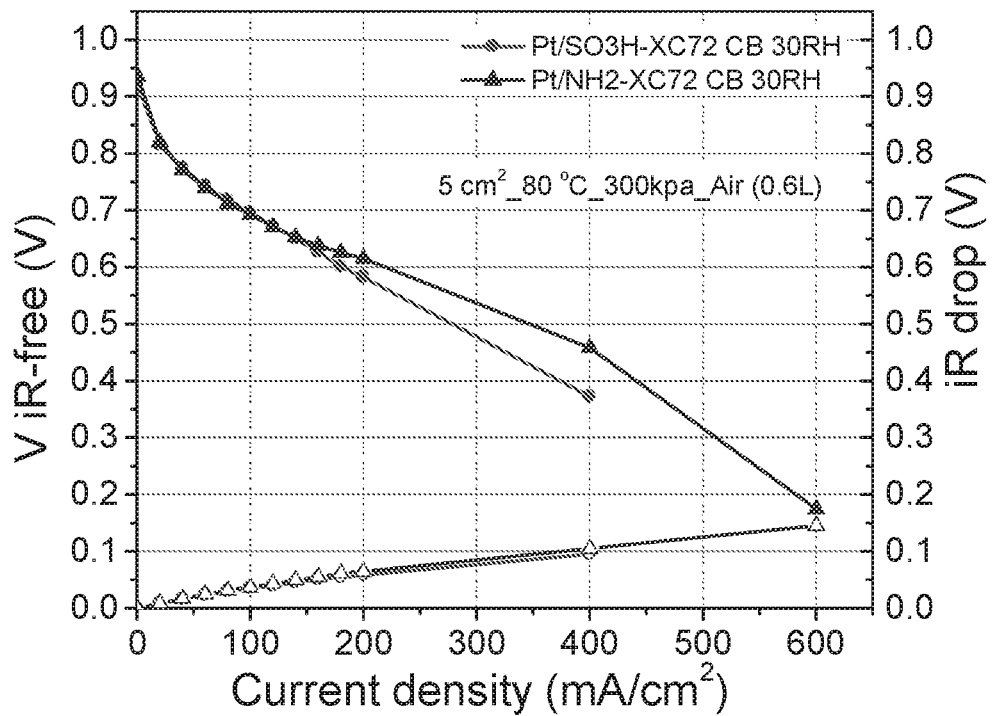
FIG. 18C shows voltage and current density data at 30% relative humidity in an atmosphere of air at 300 kPa.

With reference to FIGS. 18A-18C, voltage and current density data in an atmosphere of air at 300 kPa at relative humidity values of 80%, 55%, and 30% are shown respectively.

FIG. 19 contains a table having data at collected under an atmosphere of pure $O_2$ at relative humidity values of 100%, 85%, 55%, and 30%.

Accordingly, novel methods of fabricating membrane electrode assembly (MEA) utilizing such interfaces with exceptional performance on mass activity, high current density performance and low RH performance are also disclosed.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method manufacturing a functionalized catalyst comprising at least one of a nanoparticle or a single-layer membrane electrode assembly, the method comprising:
   catalyzing a substrate with a metal oxide to form a catalyst comprising a metal, wherein the metal comprises at least one of Pt, Rh, Pd, Ag, Au, Ni, Os, Ir, Mn, Co, alloys thereof, oxides thereof, or mixtures thereof to provide a loaded catalyst;
   functionalizing the catalyzed substrate with a first charged functional group by covalently grafting the first charged functional group to the catalyzed substrate;
   adding an ionomer to the loaded functionalized catalyst; and
   modifying a surface charge of the substrate with a diazonium reaction.

2. The method of claim 1, further comprising modifying a hydrophobicity of the substrate with a diazonium reaction.

3. The method of claim 1, wherein the first functional group comprises at least one of sulfonate, $SO_3^-$, carboxylate, $COO^-$, a tertiary amine, $NR_3^+$, where R is H, alkyl, aryl, or combinations thereof, polybenzimidazole (PBI), poly(ethylene oxide) (PEO), polyphenylene oxide (PPO), polyaniline (PANT), or mixtures thereof.

4. The method of claim 1, wherein the addition of the ionomer to the loaded functionalized catalyst includes forming an ionomer film on the substrate.

5. The method of claim 1, wherein the ionomer comprises an ionomer charged functional group and the ionomer charged functional group is oppositely charged from the first charged functional group.

6. The method of claim 1, further comprising:
   treating the functionalized catalyst with heat, an acid wash, or both; and
   functionalizing the treated functionalized catalyst with a second ionomer having a second ionomer functional group.

7. The method of claim 1, wherein the first functional group comprises at least one of

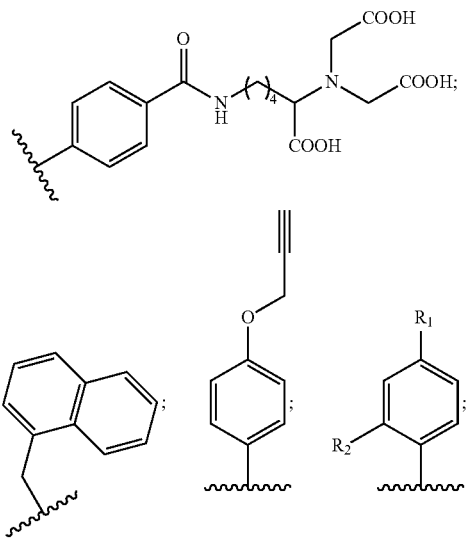

-continued

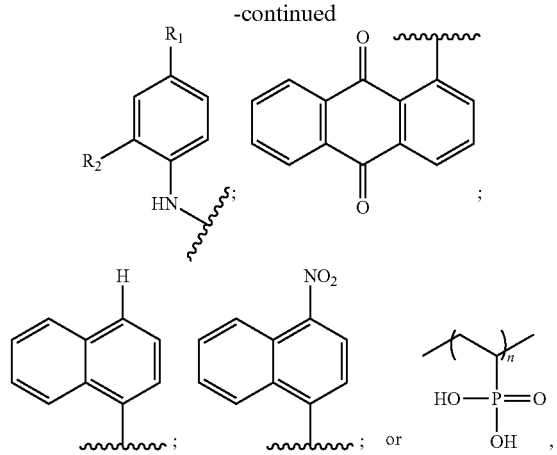

wherein
R₁ is selected from the group consisting of SO₃H, COOH, NH₂, PANI, PBI, PEO, Cl, CH₃, NO₂, Br, N(CH₃)₂, OCH₃, OH, CH₃, H,

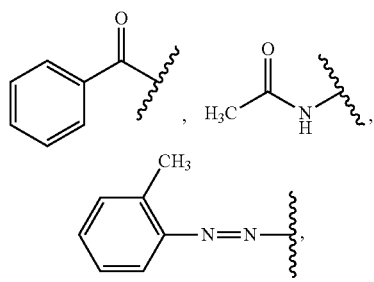

and
R₂ is selected from the group consisting of Cl, CH₃, and H, and
n is an integer from 1 to 10.

8. A method of manufacturing a functionalized catalyst comprising at least one of a nanoparticle or a single-layer membrane electrode assembly, the method comprising:
catalyzing a substrate with a metal oxide to form a catalyst comprising a metal, wherein the metal comprises at least one of Pt, Rh, Pd, Ag, Au, Ni, Os, Ir, Mn, Co, alloys thereof, oxides thereof, or mixtures thereof to provide a loaded catalyst;
functionalizing the catalyzed substrate with a first charged functional group;
adding an ionomer to the loaded functionalized catalyst; and
modifying a surface charge of the substrate with a diazonium reaction.

9. The method of claim 8, wherein functionalizing the catalyzed substrate with a first charged functional group comprises covalently grafting the first charged functional group to the catalyzed substrate.

10. The method of claim 8, further comprising modifying a hydrophobicity of the substrate with a diazonium reaction.

11. The method of claim 8, wherein the first functional group comprises at least one of sulfonate, $SO_3^-$, carboxylate, $COO^-$, a tertiary amine, $NR_3^+$, where R is H, alkyl, aryl, or combinations thereof, polybenzimidazole (PBI), poly(ethylene oxide) (PEO), polyphenylene oxide (PPO), polyaniline (PANI), or mixtures thereof.

12. The method of claim 8, wherein the addition of the ionomer to the loaded functionalized catalyst includes forming an ionomer film on the substrate.

13. The method of claim 8, wherein the ionomer comprises an ionomer charged functional group and the ionomer charged functional group is oppositely charged from the first charged functional group.

14. The method of claim 8, further comprising:
treating the functionalized catalyst with heat, an acid wash, or both; and
functionalizing the treated functionalized catalyst with a second ionomer having a second ionomer functional group.

15. The method of claim 8, wherein the first functional group comprises at least one of

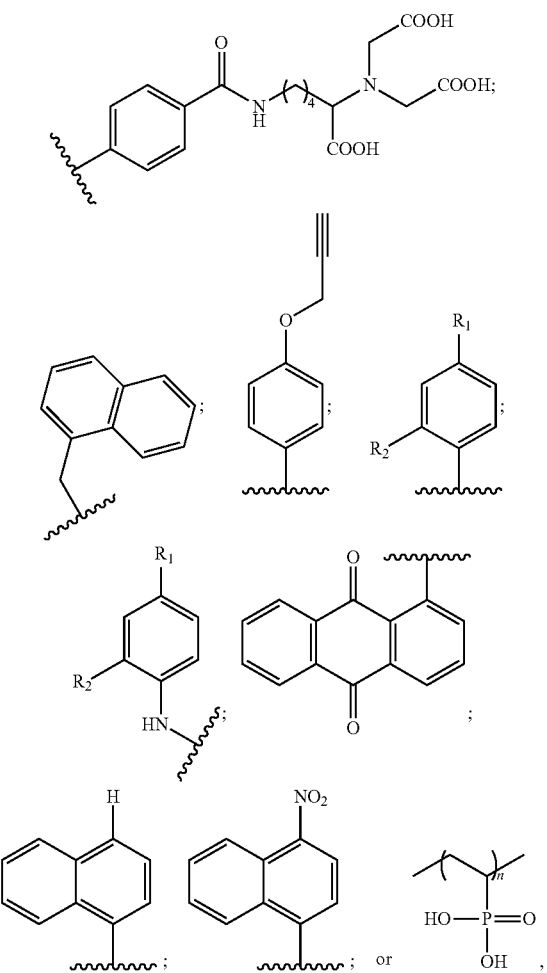

wherein
R₁ is selected from the group consisting of SO₃H, COOH, NH₂, PANI, PBI, PEO, Cl, CH₃, NO₂, Br, N(CH₃)₂, OCH₃, OH, CH₃, H,

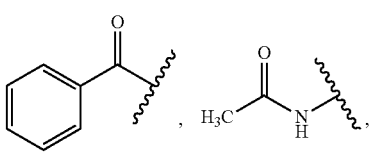

-continued

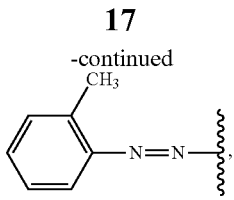

and

R$_2$ is selected from the group consisting of Cl, CH$_3$, and H, and n is an integer from 1 to 10.

16. A method manufacturing a functionalized catalyst comprising at least one of a nanoparticle or a single-layer membrane electrode assembly, the method comprising:
catalyzing a substrate with a metal oxide to form a catalyst comprising a metal, wherein the metal comprises at least one of Pt, Rh, Pd, Ag, Au, Ni, Os, Ir, Mn, Co, alloys thereof, oxides thereof, or mixtures thereof to provide a loaded catalyst;
functionalizing the catalyzed substrate with a first charged functional group; and
adding an ionomer to the loaded functionalized catalyst; and
modifying a hydrophobicity of the substrate with a diazonium reaction.

17. The method of claim 16, wherein functionalizing the catalyzed substrate with a first charged functional group comprises covalently grafting the first charged functional group to the catalyzed substrate.

18. The method of claim 16, further comprising modifying a surface charge of the substrate with a diazonium reaction.

19. The method of claim 16, wherein the first functional group comprises at least one of sulfonate, SO$_3^-$, carboxylate, COO$^-$, a tertiary amine, NR$_3^+$, where R is H, alkyl, aryl, or combinations thereof, polybenzimidazole (PBI), poly(ethylene oxide) (PEO), polyphenylene oxide (PPO), polyaniline (PANT), or mixtures thereof.

20. The method of claim 16, wherein the addition of the ionomer to the loaded functionalized catalyst includes forming an ionomer film on the substrate.

21. The method of claim 16, wherein the ionomer comprises an ionomer charged functional group and the ionomer charged functional group is oppositely charged from the first charged functional group.

22. The method of claim 16, further comprising:
treating the functionalized catalyst with heat, an acid wash, or both; and
functionalizing the treated functionalized catalyst with a second ionomer having a second ionomer functional group.

23. The method of claim 16, wherein the first functional group comprises at least one of

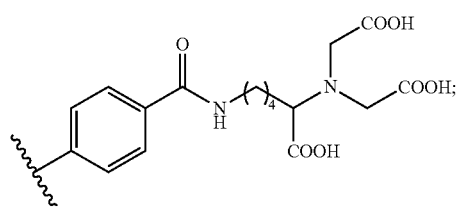

-continued

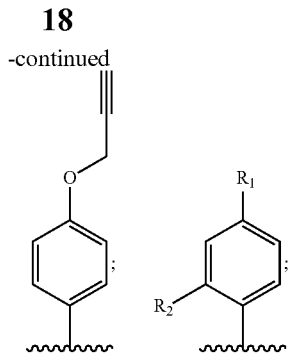

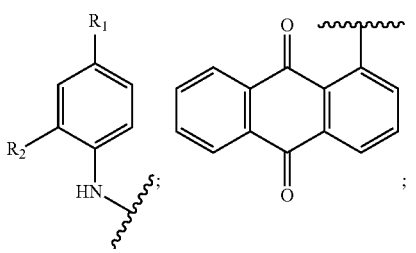

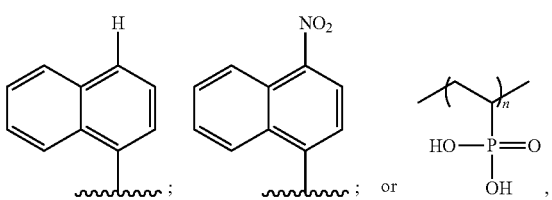

wherein

R$_1$ is selected from the group consisting of SO$_3$H, COOH, NH$_2$, PANI, PBI, PEO, Cl, CH$_3$, NO$_2$, Br, N(CH$_3$)$_2$, OCH$_3$, OH, CH$_3$, H,

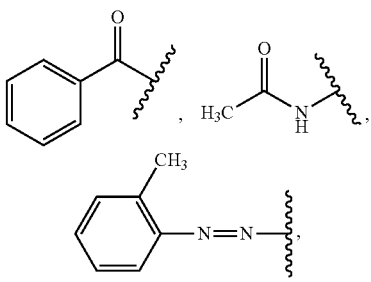

and

R$_2$ is selected from the group consisting of Cl, CH$_3$, and H, and n is an integer from 1 to 10.

* * * * *